US009747366B2

(12) United States Patent
Iikura et al.

(10) Patent No.: US 9,747,366 B2
(45) Date of Patent: Aug. 29, 2017

(54) CONFIGURATION INFORMATION MANAGEMENT METHOD AND CONFIGURATION INFORMATION MANAGEMENT APPARATUS

(71) Applicant: FUJITSU LIMITED, Kawasaki-shi, Kanagawa (JP)

(72) Inventors: Fumi Iikura, Shinagawa (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 390 days.

(21) Appl. No.: 14/616,883

(22) Filed: Feb. 9, 2015

(65) Prior Publication Data
US 2015/0254337 A1 Sep. 10, 2015

(30) Foreign Application Priority Data

Mar. 7, 2014 (JP) ................................. 2014-045464

(51) Int. Cl.
G06F 17/30 (2006.01)
G06F 17/00 (2006.01)
(52) U.S. Cl.
CPC .............................. G06F 17/30707 (2013.01)
(58) Field of Classification Search
CPC .................................................. G06F 17/30707
See application file for complete search history.

(56) References Cited

U.S. PATENT DOCUMENTS 5,212,792 A * 5/1993 Gerety ...................... G06F 8/20
717/100
8,037,077 B2 * 10/2011 Takahashi .............. G06Q 30/06
707/747
8,526,306 B2 * 9/2013 Jungck ................ H04L 63/0245
370/230

(Continued)

FOREIGN PATENT DOCUMENTS

JP 2010-108223 5/2010
WO 2010-024133 3/2010

OTHER PUBLICATIONS

Jan A. Purchase & Russel L. Winder, "Message Pattern Specifications: A New Technique for Handling Errors in Parrallel Object Oriented Systems", Department of Computer Science, University College London, ACM, 1990, pp. 116-125.*

Primary Examiner — Cheryl Lewis
(74) Attorney, Agent, or Firm — Fujitsu Patent Center

(57) ABSTRACT

A program stored in a computer-readable medium causes a computer to execute a process including acquiring configuration information and first log with respect to a first device and configuration information and second log with respect to a second device, classifying messages included in the first and second log in accordance with a similarity between the messages to generate a message pattern including a variable portion that is different between the classified messages, and storing the message pattern in association with the configuration information when match or mismatch between a value of the configuration information of the first device and a (Continued)

corresponding value of the configuration information of the second device is consistent with match or mismatch between a value corresponding to the variable portion of the message pattern in the first log and a value corresponding to the variable portion of the message pattern in the second log.

5 Claims, 25 Drawing Sheets

(56) References Cited

U.S. PATENT DOCUMENTS

| | | | |
|---|---|---|---|
| 8,532,610 B2* | 9/2013 | Manning Cassett | H04L 43/026 455/405 |
| 8,949,177 B2* | 2/2015 | Chen | H04M 3/2218 707/609 |
| 2007/0100884 A1* | 5/2007 | Brown | G06Q 10/06 |
| 2010/0057667 A1 | 3/2010 | Gotoh et al. | |

* cited by examiner

FIG. 4A

SERVER: srv01

| PARAMETER NAME | SETTING VALUE |
|---|---|
| version | 5.5.31 |
| bind-address | 127.0.0.1 |
| innodb | TRUE |

LOG
```
130625 6:03:16 [Note] /usr/sbin/mysqld: Normal shutdown
130708 1:59:43 [Note] Server hostname (bind-address): '127.0.0.1'; port: 3306
130708 1:59:43 InnoDB: Started; log sequence number 0 152689729
130708 1:59:43 [Note] /usr/sbin/mysqld: ready for connections.
Version '5.5.31' socket: '/var/run/mysqld/mysqld.sock' port: 3306
130708 11:47:39 [Warning] Access denied for user 'mark'@'localhost' (using password: NO)
130708 11:50:20 [Warning] Access denied for user 'root'@'somehost' (using password: YES)
...
```

FIG. 4B

SERVER: srv02

| PARAMETER NAME | SETTING VALUE |
|---|---|
| version | 5.5.31 |
| bind-address | 0.0.0.0 |
| innodb | TRUE |

LOG
```
130625 7:03:16 [Note] /usr/sbin/mysqld: Normal shutdown
130708 1:57:43 [Note] Server hostname (bind-address): '0.0.0.0'; port: 3306
130708 1:57:43 InnoDB: Started; log sequence number 0 152685830
130708 1:57:43 [Note] /usr/sbin/mysqld: ready for connections.
Version '5.5.31' socket: '/var/run/mysqld/mysqld.sock' port: 3306
...
```

FIG. 4C

SERVER: srv03

| PARAMETER NAME | SETTING VALUE |
|---|---|
| version | 5.5.29 |
| bind-address | 127.0.0.1 |
| innodb | TRUE |

LOG
```
130625 8:03:16 [Note] /usr/sbin/mysqld: Normal shutdown
130708 1:58:43 [Note] Server hostname (bind-address): '127.0.0.1'; port: 3306
130708 1:58:43 InnoDB: Started; log sequence number 0 152686826
130708 1:58:43 [Note] /usr/sbin/mysqld: ready for connections.
Version '5.5.29' socket: '/var/run/mysqld/mysqld.sock' port: 3306
...
```

FIG. 4D

SERVER: srv04

| PARAMETER NAME | SETTING VALUE |
|---|---|
| version | 5.5.29 |
| bind-address | 0.0.0.0 |
| innodb | TRUE |

LOG 130625 9:03:16 [Note] /usr/sbin/mysqld: Normal shutdown
130708 1:56:43 [Note] Server hostname (bind-address): '0.0.0.0'; port: 3306
130708 1:56:43 InnoDB: Started; log sequence number 0 152685375
130708 1:56:43 [Note] /usr/sbin/mysqld: ready for connections.
Version: '5.5.29' socket: '/var/run/mysqld/mysqld.sock' port: 3306
...

FIG. 4E

SERVER: srv05

| PARAMETER NAME | SETTING VALUE |
|---|---|
| version | 5.5.31 |
| bind-address | 127.0.0.1 |
| innodb | FALSE |

LOG 130625 5:03:16 [Note] /usr/sbin/mysqld: Normal shutdown
130708 1:55:43 [Note] Server hostname (bind-address): '127.0.0.1'; port: 3306
130708 1:55:43 [Note] /usr/sbin/mysqld: ready for connections.
Version: '5.5.31' socket: '/var/run/mysqld/mysqld.sock' port: 3306
...

FIG. 4F

SERVER: srv06

| PARAMETER NAME | SETTING VALUE |
|---|---|
| version | 5.5.31 |
| bind-address | 0.0.0.0 |
| innodb | FALSE |

LOG 130625 4:03:16 [Note] /usr/sbin/mysqld: Normal shutdown
130708 1:54:43 [Note] Server hostname (bind-address): '0.0.0.0'; port: 3306
130708 1:54:43 [Note] /usr/sbin/mysqld: ready for connections.
Version: '5.5.31' socket: '/var/run/mysqld/mysqld.sock' port: 3306
...

FIG. 5A srv01: m₁ [Note] Server hostname (bind-address): '127.0.0.1'; port: 3306
m₂ Version: '5.5.31' socket: '/var/run/mysqld/mysqld.sock' port: 3306

FIG. 5B srv02: m₃ [Note] Server hostname (bind-address): '0.0.0.0'; port: 3306
m₄ Version: '5.5.31' socket: '/var/run/mysqld/mysqld.sock' port: 3306

FIG. 5C srv03: m₅ [Note] Server hostname (bind-address): '127.0.0.1'; port: 3306
m₆ Version: '5.5.29' socket: '/var/run/mysqld/mysqld.sock' port: 3306

FIG. 5D srv04: m₇ [Note] Server hostname (bind-address): '0.0.0.0'; port: 3306
m₈ Version: '5.5.29' socket: '/var/run/mysqld/mysqld.sock' port: 3306

| WORD ORDER | $m_2$ | $m_6$ | NO CONSISTENCE |
|---|---|---|---|
| 1 | Version: | Version: | |
| 2 | '5.5.31' | '5.5.29' | ✓ |
| 3 | socket: | socket: | |
| 4 | '/var/run/... | '/var/run/... | |
| 5 | port: | port: | |
| 6 | 3306 | 3306 | |

F I G. 6 A

| WORD ORDER | $m_2$ | $m_3$ | NO CONSISTENCE |
|---|---|---|---|
| 1 | Version: | [Note] | ✓ |
| 2 | '5.5.31' | Server | ✓ |
| 3 | socket: | hostname | ✓ |
| 4 | '/var/run/... | (bind-address) | ✓ |
| 5 | | '0.0.0.0' | ✓ |
| 6 | port: | port: | |
| 7 | 3306 | 3306 | |

F I G. 6 B

|  | $m_1$ | $m_3$ | $m_5$ | $m_7$ | $m_2$ | $m_4$ | $m_6$ | $m_8$ |
|---|---|---|---|---|---|---|---|---|
| $m_1$ | – | 0.86 | 1.0 | 0.86 | 0.29 | 0.29 | 0.29 | 0.29 |
| $m_3$ |  | – | 0.86 | 1.0 | 0.29 | 0.29 | 0.29 | 0.29 |
| $m_5$ |  |  | – | 0.86 | 0.29 | 0.29 | 0.29 | 0.29 |
| $m_7$ |  |  |  | – | 0.29 | 0.29 | 0.29 | 0.29 |
| $m_2$ |  |  |  |  | – | 1.0 | 0.83 | 0.83 |
| $m_4$ |  |  |  |  |  | – | 0.83 | 0.83 |
| $m_6$ |  |  |  |  |  |  | – | 1.0 |
| $m_8$ |  |  |  |  |  |  |  | – |

F I G. 7

$t_1$ [Note] /usr/sbin/mysqld: Normal shutdown
$t_2$ [Note] Server hostname (bind-address) $v_1$ port: $v_2$
$t_3$ [Note] /usr/sbin/mysqld: ready for connections.
$t_4$ Version: $v_1$ socket: '/var/run/mysqld/mysqld.sock' port: $v_2$
$t_5$ [Warning] Access denied for user $v_1$ using password: $v_1$
$t_6$ InnoDB: Started; log sequence number 0 $v_1$

| | SETTING VALUE FOR THE PARAMETER "version" | |
|---|---|---|
| | 5.5.31 | 5.5.29 |
| $t_1$ | ○ | ○ |
| $t_2$-$v_1$ | 127.0.0.1, 0.0.0.0 | 127.0.0.1, 0.0.0.0 |
| $t_2$-$v_2$ | 3306 | 3306 |
| $t_3$ | ○ | ○ |
| $t_4$-$v_1$ | 5.5.31 | 5.5.29 |
| $t_4$-$v_2$ | 3306 | 3306 |
| $t_5$-$v_1$ | localhost, somehost, × | × |
| $t_5$-$v_2$ | NO, YES, × | × |
| $t_6$-$v_1$ | 29, 30, × | 26, 75 |

FIG. 10B

| | SETTING VALUE FOR THE PARAMETER "bind-address" | |
|---|---|---|
| | 127.0.0.1 | 0.0.0.0 |
| $t_1$ | ○ | ○ |
| $t_2$-$v_1$ | 127.0.0.1 | 0.0.0.0 |
| $t_2$-$v_2$ | 3306 | 3306 |
| $t_3$ | ○ | ○ |
| $t_4$-$v_1$ | 5.5.31, 5.5.29 | 5.5.31, 5.5.29 |
| $t_4$-$v_2$ | 3306 | 3306 |
| $t_5$-$v_1$ | localhost, somehost, × | × |
| $t_5$-$v_2$ | NO, YES, × | × |
| $t_6$-$v_1$ | 29, 26, × | 30, 75, × |

FIG. 10C

| | SETTING VALUE FOR THE PARAMETER "innodb" | |
|---|---|---|
| | TRUE | FALSE |
| $t_1$ | ○ | ○ |
| $t_2$-$v_1$ | 127.0.0.1, 0.0.0.0 | 127.0.0.1, 0.0.0.0 |
| $t_2$-$v_2$ | 3306 | 3306 |
| $t_3$ | ○ | ○ |
| $t_4$-$v_1$ | 5.5.31, 5.5.29 | 5.5.31 |
| $t_4$-$v_2$ | 3306 | 3306 |
| $t_5$-$v_1$ | localhost, somehost, × | × |
| $t_5$-$v_2$ | NO, YES, × | × |
| $t_6$-$v_1$ | 29, 30, 26, 75 | × |

FIG. 11A

| | SETTING VALUE FOR THE PARAMETER "version" | |
|---|---|---|
| | 5.5.31 | 5.5.29 |
| $t_1$ | ○ | ○ |
| $t_2$–$v_1$ | 127.0.0.1, 0.0.0.0 | 127.0.0.1, 0.0.0.0 |
| $t_2$–$v_2$ | 3306 | 3306 |
| $t_3$ | ○ | ○ |
| $t_4$–$v_1$ | 5.5.31 | 5.5.29 |
| $t_4$–$v_2$ | 3306 | 3306 |
| $t_5$–$v_1$ | localhost, somehost, × | × |
| $t_5$–$v_2$ | NO, YES, × | × |
| $t_6$–$v_1$ | 29, 30, × | 26, 75 |

FIG. 11B

| | SETTING VALUE FOR THE PARAMETER "bind-address" | |
|---|---|---|
| | 127.0.0.1 | 0.0.0.0 |
| $t_1$ | ○ | ○ |
| $t_2$–$v_1$ | 127.0.0.1 | 0.0.0.0 |
| $t_2$–$v_2$ | 3306 | 3306 |
| $t_3$ | ○ | ○ |
| $t_4$–$v_1$ | 5.5.31, 5.5.29 | 5.5.31, 5.5.29 |
| $t_4$–$v_2$ | 3306 | 3306 |
| $t_5$–$v_1$ | localhost, somehost, × | × |
| $t_5$–$v_2$ | NO, YES, × | × |
| $t_6$–$v_1$ | 29, 26, × | 30, 75, × |

FIG. 11C

| | SETTING VALUE FOR THE PARAMETER "innodb" | |
|---|---|---|
| | TRUE | FALSE |
| $t_1$ | ○ | ○ |
| $t_2$–$v_1$ | 127.0.0.1, 0.0.0.0 | 127.0.0.1, 0.0.0.0 |
| $t_2$–$v_2$ | 3306 | 3306 |
| $t_3$ | ○ | ○ |
| $t_4$–$v_1$ | 5.5.31, 5.5.29 | 5.5.31 |
| $t_4$–$v_2$ | 3306 | 3306 |
| $t_5$–$v_1$ | localhost, somehost, × | × |
| $t_5$–$v_2$ | NO, YES, × | × |
| $t_6$–$v_1$ | 29, 30, 26, 75 | × |

| | 5.5.31 | 5.5.29 |
|---|---|---|
| | SETTING VALUE FOR THE PARAMETER "version" | |
| $t_1$ | ○ | |
| $t_2$-$v_1$ | 127.0.0.1, 0.0.0.0 | 127.0.0.1, 0.0.0.0 |
| $t_2$-$v_2$ | 3306 | 3306 |
| $t_3$ | ○ | |
| $t_4$-$v_1$ | 5.5.31 | 5.5.29 |
| $t_4$-$v_2$ | 3306 | 3306 |
| $t_5$-$v_1$ | localhost, somehost | localhost, somehost |
| | × | × |
| $t_5$-$v_2$ | NO, YES, × | NO, YES, × |
| $t_6$-$v_1$ | 29, 30, × | 26, 75 |

FIG. 13B

| | 127.0.0.1 | 0.0.0.0 |
|---|---|---|
| | SETTING VALUE FOR THE PARAMETER "bind-address" | |
| $t_1$ | ○ | |
| $t_2$-$v_1$ | 127.0.0.1 | 0.0.0.0 |
| $t_2$-$v_2$ | 3306 | 3306 |
| $t_3$ | ○ | |
| $t_4$-$v_1$ | 5.5.31, 5.5.29 | 5.5.31, 5.5.29 |
| $t_4$-$v_2$ | 3306 | 3306 |
| $t_5$-$v_1$ | localhost, somehost, × | × |
| $t_5$-$v_2$ | NO, YES, × | × |
| $t_6$-$v_1$ | 29, 26, × | 30, 75, × |

FIG. 13C

| | TRUE | FALSE |
|---|---|---|
| | SETTING VALUE FOR THE PARAMETER "innodb" | |
| $t_1$ | ○ | |
| $t_2$-$v_1$ | 127.0.0.1, 0.0.0.0 | 127.0.0.1, 0.0.0.0 |
| $t_2$-$v_2$ | 3306 | 3306 |
| $t_3$ | ○ | |
| $t_4$-$v_1$ | 5.5.31, 5.5.29 | 5.5.31 |
| $t_4$-$v_2$ | 3306 | 3306 |
| $t_5$-$v_1$ | localhost, somehost, × | × |
| $t_5$-$v_2$ | NO, YES, × | × |
| $t_6$-$v_1$ | 29, 30, 26, 75 | × |

| ID 51 | PATTERN 52 | POSITION OF VARIABLE PORTION 53 | POSITION ASSOCIATED WITH PARAMETER 54 | CORRESPONDENCE TABLE ID 55 | PARAMETER 56 |
|---|---|---|---|---|---|
| 1 | Version: $v_1$ socket: '/var/run/mysqld/mysqld.sock' port: $v_2$ | 1, 5 | 1 | - | version |
| 2 | [Note] Server hostname (bind-address): $v_1$ port: $v_2$ | 4, 6 | 4 | - | bind-address |
| 3 | InnoDB: Started; log sequence number 0 $v_1$ | 6 | - | 5 | innodb |

F I G. 1 4 A

CORRESPONDENCE TABLE ID: 5

| MESSAGE | PARAMETER |
|---|---|
| ○ | TRUE |
| × | FALSE |

| ID | PATTERN | POSITION OF VARIABLE PORTION | POSITION ASSOCIATED WITH PARAMETER | CORRESPONDENCE TABLE ID | PARAMETER |
|---|---|---|---|---|---|
| 1 | Version: $v_1$ socket: '/var/run/mysqld/mysqld.sock' port: $v_2$ | 1, 5 | 1 | - | version |

FIG. 15B

```
if ($str =~ /Version:.* socket: '/var/run/mysqld/mysqld.sock' port: .*/) {    #1
    my @var = split (/ /, $str);                                               #2
    &config_update("mysql.version ", $var[1]);                                 #3
}                                                                              #4
```

FIG. 16A

| ID 51 | PATTERN 52 | POSITION OF VARIABLE PORTION 53 | POSITION ASSOCIATED WITH PARAMETER 54 | CORRESPONDENCE TABLE ID 55 | PARAMETER 56 |
|---|---|---|---|---|---|
| 3 | InnoDB: Started; log sequence number 0 $v_1$ | 6 | - | 5 | innodb |

FIG. 16B

CORRESPONDENCE TABLE ID: 5

| MESSAGE | PARAMETER |
|---|---|
| ○ | TRUE |
| × | FALSE |

FIG. 16C

```
innodb_flag = 0                                              #1
(OMITTED)                                                    #2
if ($str =~ /InnoDB: Started; log sequence number 0 .*/) {   #3
    &config_update("mysql.innodb", "TRUE");                  #4
    innodb_flag = 1                                          #5
}                                                            #6
(OMITTED)                                                    #7
if (innodb_flag == 0) {                                      #8
    &config_update("mysql.innodb", "FALSE")                  #9
}                                                            #10
```

130808 1:59:43 InnoDB: Started; log sequence number 0 152689729
130808 1:59:43 [Note] /usr/sbin/mysqld: ready for connections.
Version: '5.5.31' socket: '/var/run/mysqld/mysqld.sock' port: 3306

| PARAMETER NAME | SETTING VALUE |
|---|---|
| version | 5.5.29 |
| bind-address | (OMITTED) |
| innodb | TRUE |

| PARAMETER NAME | SETTING VALUE |
|---|---|
| version | 5.5.31 |
| bind-address | (OMITTED) |
| innodb | TRUE |

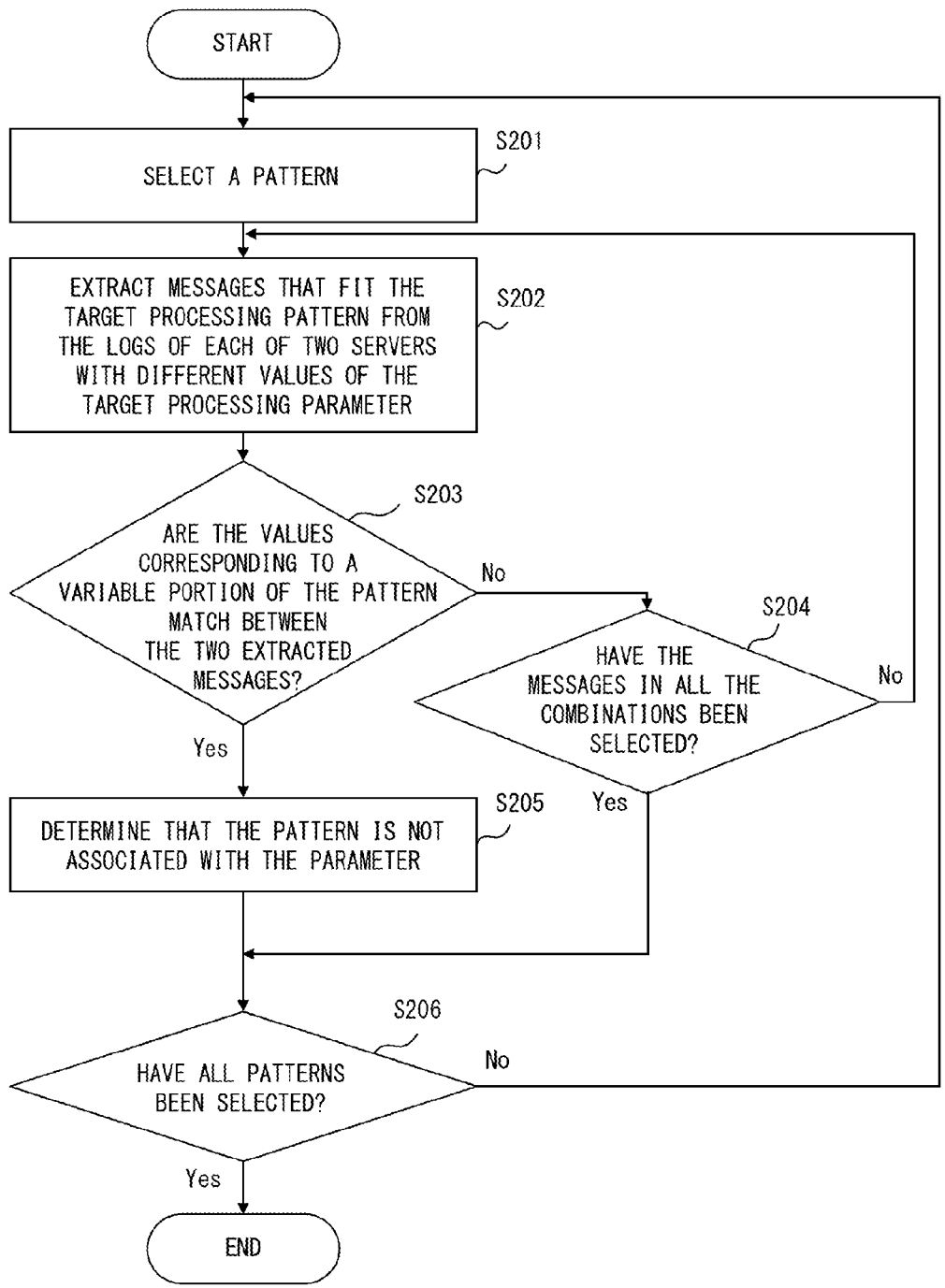
F I G. 19

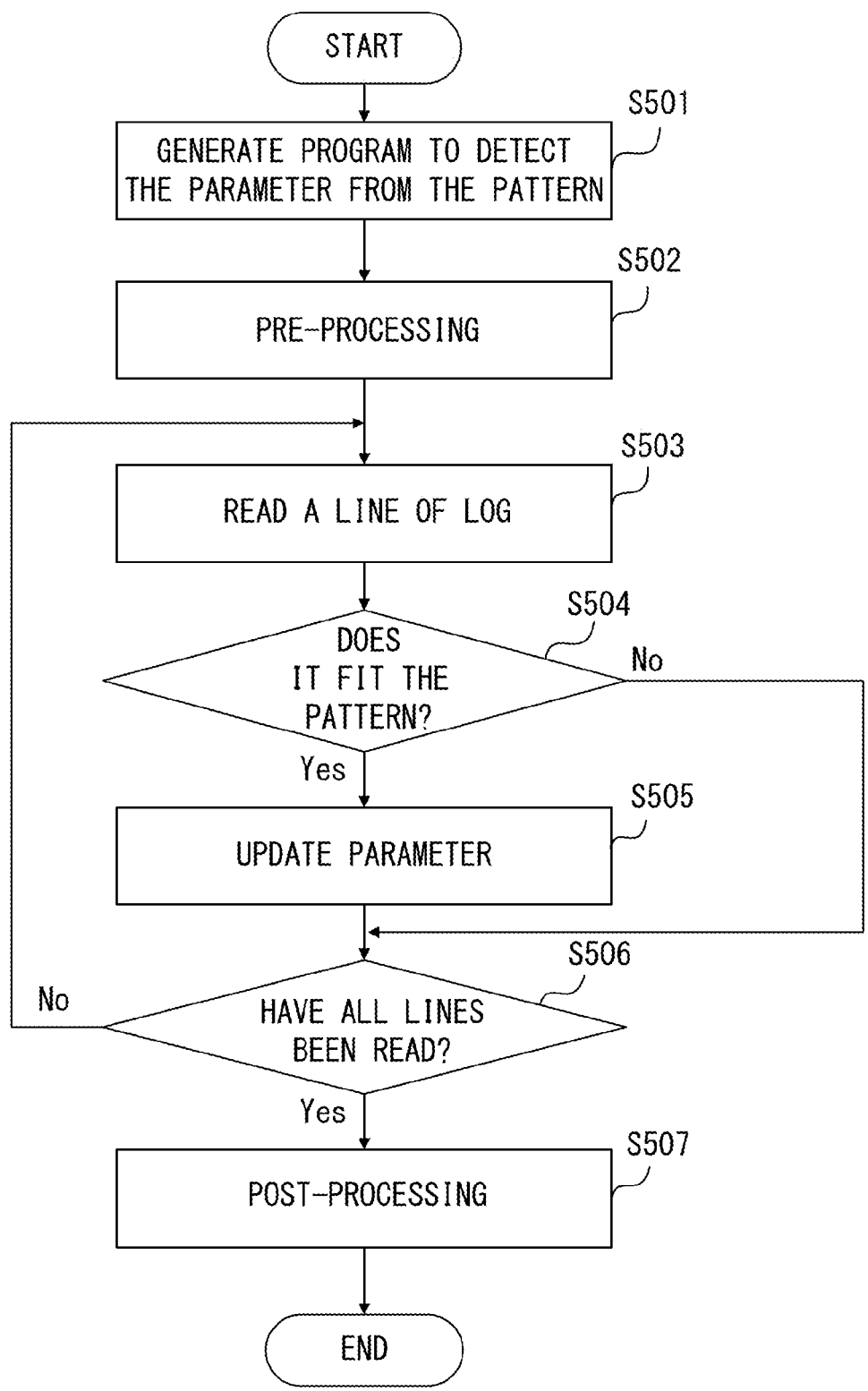
F I G. 22

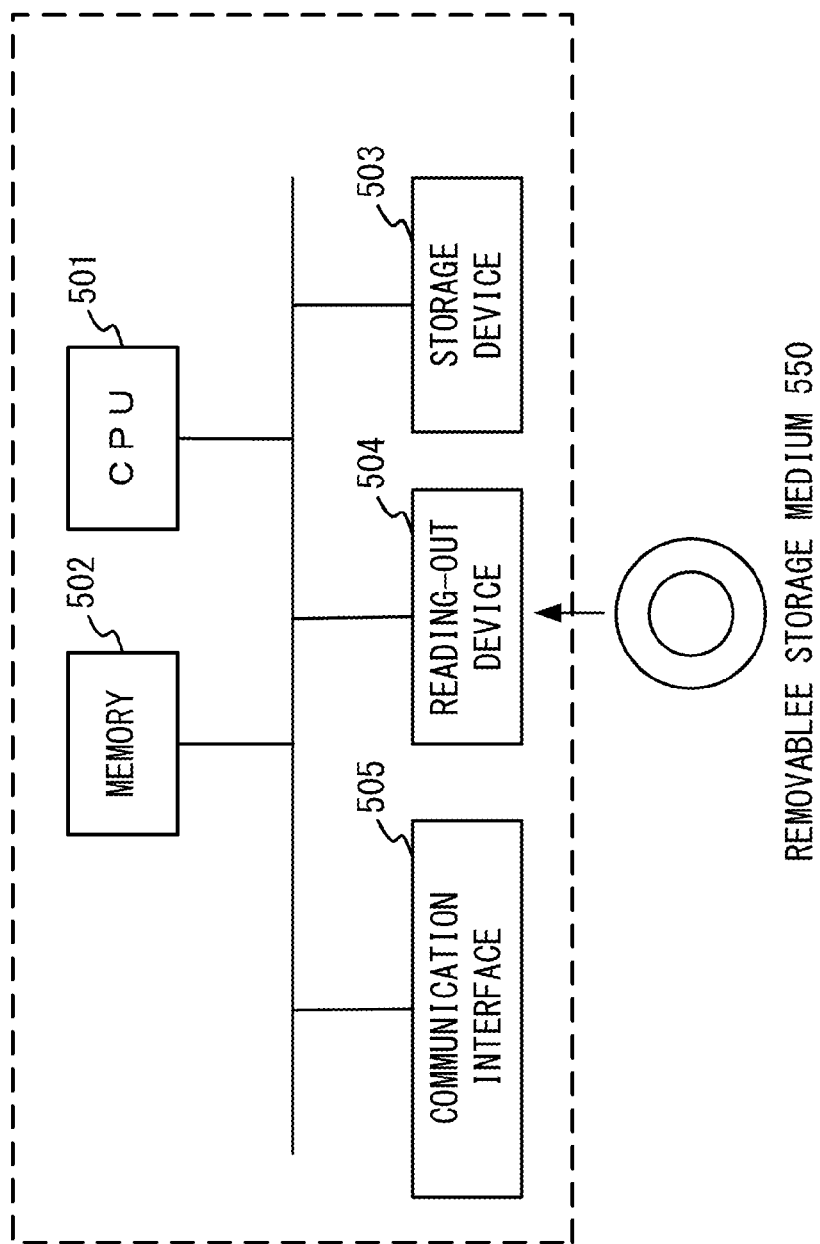
F I G. 2 3

CONFIGURATION INFORMATION MANAGEMENT METHOD AND CONFIGURATION INFORMATION MANAGEMENT APPARATUS

CROSS-REFERENCE TO RELATED APPLICATION

This application is based upon and claims the benefit of priority of the prior Japanese Patent Application No. 2014-045464, filed on Mar. 7, 2014, the entire contents of which are incorporated herein by reference.

FIELD

The present invention relates to management of information.

BACKGROUND

A configuration management apparatus for managing a plurality of devices in data centers, for example, grasps configuration information of each device and, at the request of a user, responds to information in the configuration information. Notification of update of the configuration information is given on the basis of a program of each device.

FIG. 1 is an example of a configuration information management system. In FIG. 1, a plurality of tenants each run multiple servers in the cloud or data centers. A server included in the tenant is a physical server or a virtual server. The number of servers is, for example, 1,000 or more. In order to perform configuration management and log monitoring of the servers, software such as a configuration management tool, for example, is installed to run in each server. This software then sends configuration information and log information of each server to a configuration information management apparatus that performs management of the configuration information and monitoring of the logs. The configuration information management apparatus includes a configuration information database. The configuration information management apparatus stores configuration information received from the server in the configuration database and manages the configuration information.

When the software in each server is updated, the configuration information of the server is also updated. In such a case, the server software notifies the configuration information management apparatus of the updated configuration information. In the event of a failure, each server obtains the configuration information from the configuration information management apparatus for troubleshooting. Configuration information obtained for troubleshooting is required to be the latest information at all times.

Note that techniques have been known which are described in the following literature.
International Publication Pamphlet No. WO 2010/024133
Japanese Laid-open Patent Publication No. 2010-108223.

SUMMARY

According to one aspect, a computer-readable recording medium having stored therein a program for causing a computer to execute a process including, acquiring configuration information and first log data with respect to a first device and configuration information and second log data with respect to a second device, classifying a plurality of messages included in the first log data and the second log data in accordance with a similarity between the messages to generate a message pattern including a variable portion that is different between the classified messages, and storing the message pattern in association with the configuration information when match or mismatch between a value of the configuration information of the first device and a corresponding value of the configuration information of the second device is consistent with match or mismatch between a value corresponding to the variable portion of the message pattern in the first log data and a value corresponding to the variable portion of the message pattern in the second log data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A-4F are diagrams illustrating an example of combinations of configuration information and a log that an acquisition unit acquires in a learning stage.

FIGS. 5A-5D are diagrams illustrating messages to be focused in explaining the processing of the learning stage.

FIGS. 6A and 6B are diagrams explaining a comparison of similarity between messages.

FIG. 7 is a diagram illustrating information that summarizes the result of calculating a degree of similarity.

FIG. 9 is an example of a pattern that is generated when the configuration information and the log are input as illustrated in FIG. 4.

FIGS. 10A-10C are examples (1) of an association table.
FIGS. 11A-11C are examples (2) of an association table.
FIGS. 12A-12C are examples (3) of an association table.
FIGS. 13A-13C are examples (4) of an association table.
FIGS. 14A and 14B are examples of a configuration of a pattern table and a correspondence table.

FIGS. 15A and 15B are diagrams explaining the generation of a detection program for a parameter "version".

FIGS. 16A-16C are diagrams explaining the generation of a detection program for a parameter "innodb".

FIG. 19 is a flowchart illustrating in detail processing for determining that a pattern in which variable portions match when values of the target processing parameter are different is non-associated with the target processing parameter.

FIG. 22 is a flowchart illustrating processing in the detection stage.

FIG. 23 is a diagram illustrating an example of a hardware configuration of a configuration information management apparatus.

DESCRIPTION OF EMBODIMENTS

During notification of an update of configuration information, there are cases where the update is not notified depending on the program of each server, or where the notification is delayed because the notification is executed together with other notifications, for example. If there is no notification regardless of changes in the configuration information of an apparatus, a configuration information management apparatus would not be able to correctly respond to a request from the user, because the configuration information management apparatus does not have the latest configuration information.

The configuration information management apparatus according to the embodiments can generate information for rapid detection of an update of configuration information.

Figure 1:
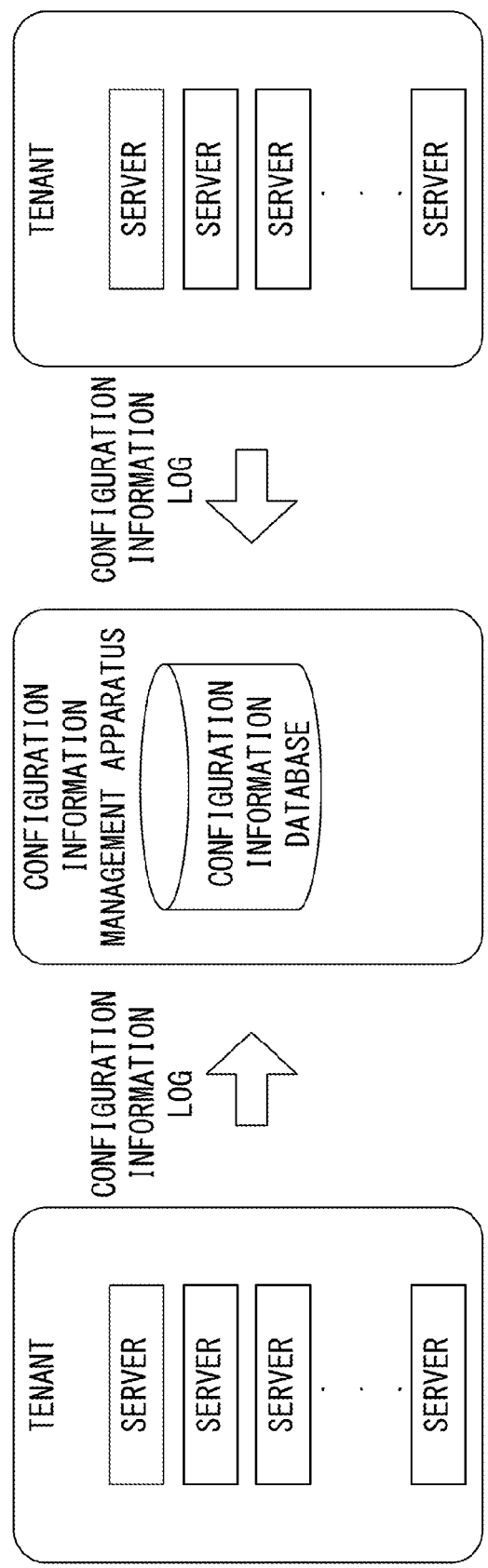
FIG. 1 is an example of a configuration information management system.
Figure 2:
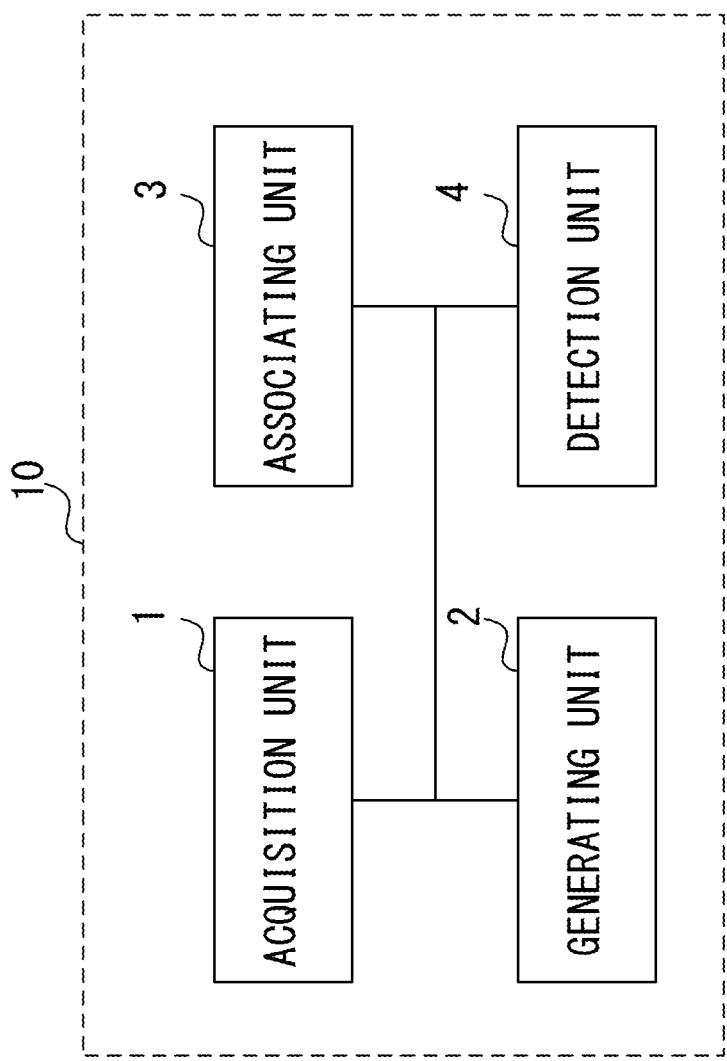
FIG. 2 is a functional block diagram illustrating a configuration of an embodiment of a configuration information management apparatus.

FIG. 2 is a functional block diagram illustrating a configuration of an embodiment of the configuration information management apparatus. In FIG. 2, the configuration information management apparatus 10 includes an acquisition unit 1, a generating unit 2, an associating unit 3, and a detection unit 4.

The acquisition unit 1 acquires configuration information and first log data of a first device, and configuration information and second log data of a second device.

The generating unit 2 classifies a plurality of messages included in the first log data and the second log data on the basis of similarity between the messages and generates a message pattern including a variable portion that differs between the classified messages.

The associating unit 3 stores a message pattern in association with configuration information when match or mismatch between a value of configuration information of the first device and a corresponding value of the configuration information of the second device is consistent with match or mismatch between a value corresponding to the variable portion in a message pattern in the first log data and a value corresponding to the variable portion in a message pattern in the second log data.

In addition, the acquisition unit 1 acquires configuration information and third log data of a third device.

Also, the generating unit 2 classifies a plurality of messages included in the first log data, the second log data and the third log data on the basis of similarity between the messages and generates a message pattern including a variable portion that differs between the classified messages.

Furthermore, the associating unit 3 stores a message pattern in association with configuration information in a case in which a value of configuration information of the first device is different from a corresponding value of the configuration information of the second device and the value of the configuration information of the first device matches a corresponding value of the configuration information of the third device, when a value corresponding to the variable portion of a message pattern in the first log data is different from a value corresponding to the variable portion of the message pattern in the second log data and when the value corresponding to the variable portion of the message pattern in the first log data matches a value corresponding to the variable portion of the message pattern in the third log data.

In addition, the associating unit 3 stores a variable portion in association with configuration information when match or mismatch between a value of configuration information of the first device and a corresponding value of the configuration information of the second device is consistent with match or mismatch between a value corresponding to the variable portion of a message pattern in the first log data and a value corresponding to the variable portion of the message pattern in the second log data.

Also, the acquisition unit 1 acquires fourth log data.

The detection unit 4 extracts a message that fits a message pattern from the fourth log data and detects a change in configuration information associated with the message pattern on the basis of a value of the variable portion of the extracted message.

The configuration information management apparatus according to the embodiments detects an update of a parameter from messages that are output to an operation log of the server. In order to detect an update from messages that are output to the operation log, the configuration information management apparatus stores in advance patterns of the log message in which parameter values are output. The configuration information management apparatus then extracts from messages that are output to the operation log a message that fits the stored pattern to specify a parameter value from the extracted message.

In the embodiments, configuration information may include a plurality of parameters and a log that is output from the server may include a plurality of messages. In the following description, when a change in configuration information is generated in the server, a parameter for which an update is to be detected from the log is referred to as a target parameter.

Processing executed by the configuration information management apparatus according to the embodiment can be divided into two stages, namely a learning stage and a detection stage. The learning stage is a stage to generate and store patterns of log messages in which parameter values are output. The detection stage is a stage to detect an update from an operation log by using the patterns that are generated in the learning stage.

In the learning stage, the configuration information management apparatus specifies a pattern of messages in which parameter values are output using the configuration information and the log of the server, and generates a pattern table in which the specified message pattern and the parameters are associated with each other. In the detection stage, the configuration information management apparatus detects a change in configuration information by identifying a message that fits a pattern from the operation log and extracting parameter values by using the pattern table generated in the learning stage.

Figure 3:
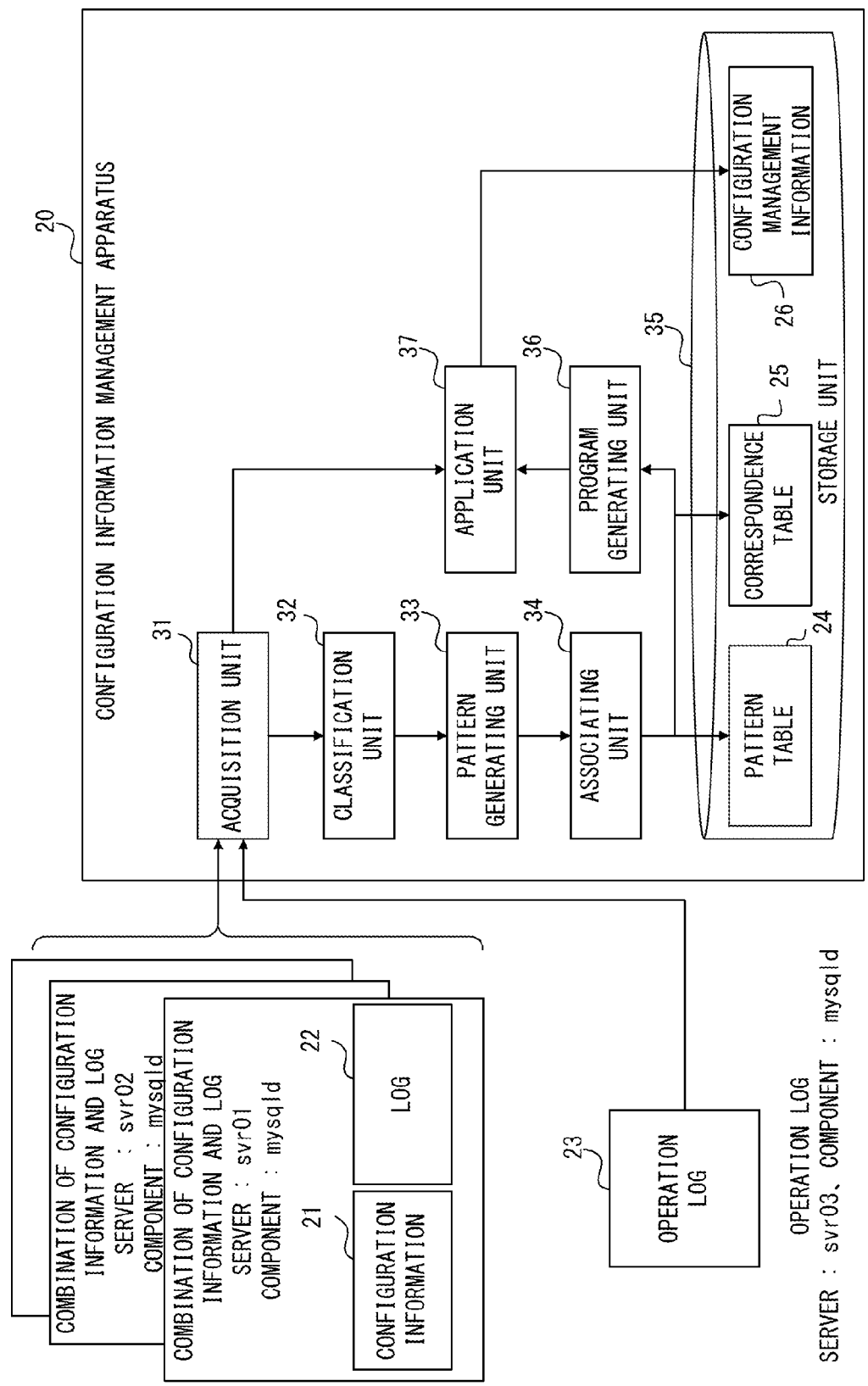
FIG. 3 is a diagram illustrating an example of a configuration of the configuration information management apparatus according to the embodiment.

FIG. 3 illustrates an example of a configuration of the configuration information management apparatus according to the embodiment. In FIG. 3, the configuration information management apparatus includes an acquisition unit 31, a classification unit 32, a pattern generating unit 33, an associating unit 34, a storage unit 35, a program generating unit 36, and an application unit 37. Of these, the acquisition unit 31, the classification unit 32, the pattern generating unit 33, the associating unit 34, and the storage unit 35 are related to the learning stage and information of a pattern table 24 and information of a correspondence table 25 are output in response to an input of a combination of configuration information 21 and a log 22. The acquisition unit 31, the storage unit 35, the program generating unit 36, and the application unit 37 are related to the detection stage and information of configuration management information 26 is output in response to an input information of an operation log 23, a pattern table 24, and a correspondence table 25.

The acquisition unit 31 is an example of the acquisition unit 1. The classification unit 32 and the pattern generating unit 33 are an example of the generating unit 2. The associating unit 34 is an example of the associating unit 3. The program generating unit 36 and the application unit 37 are an example of the detection unit 4.

First, the configurations related to the learning stage will be described.

The acquisition unit 31 acquires combinations of the configuration information 21 and the log 22 for a plurality of servers. The configuration information 21 that is acquired at this point in time contains a target parameter. The acquisition unit 31 then outputs the combination of the acquired configuration information 21 and the log 22 of a plurality of servers to the classification unit 32.

The configuration information 21 and the log 22 that are acquired at this point in time may not necessarily be the latest, but the configuration information 21 and the log 22 which are stored in advance in the configuration information management apparatus may be used. However, values of the configuration information 21 are the values at a point in time at which the log 22 was output. It should be noted that the configuration information 21 and the log 22 are of a certain component (e.g. software). For example, with respect to the component "mysqld", the configuration information 21 may be "/etc/mysql/my.cnf" and the log 22 may be "/var/log/mysql/error.log".

The classification unit 32 classifies messages into groups of each type on the basis of similarity between the messages, which have been output to the log 22. The classification unit 32 outputs the classified groups and the messages contained therein together with the configuration information 21 to the pattern generating unit 33.

In the classification of messages, for example, the classification unit 32 first selects two prescribed messages from among the messages output to the log 22 and calculates the similarity between the selected messages. Such calculation of similarity is executed by the classification unit 32 on all combinations of any two messages in all of the logs 22. The classification unit 32 then classifies the messages in such a manner that messages having a similarity that is equal to or greater than a predetermined threshold are classified into the same group.

The pattern generating unit 33 compares messages in each group classified by the classification unit 32 to identify common portions and variable portions of the messages, and generates a pattern of the messages. The pattern generating unit 33 outputs the generated pattern to the associating unit 34 together with the configuration information 21. Here, there may be a case where there are multiple groups classified by the classification unit 32. In such case, patterns may be generated as many as the number of groups.

Since messages in the same group have a degree of similarity that has been determined to be equal to or greater than a predetermined threshold, the messages are similar to each other. Accordingly, in these messages, many common portions (words, phrases) appear, but there are also some portions that differ from one another. Portions that are different among the messages in the same group are referred to as variable portions.

A pattern to be generated is composed of common portions and variables that replace variable portions in messages included in the same group. Here, the name of a variable that replaces a variable portion is identification information that can uniquely identify the variable portion in a plurality of patterns.

In identifying variable portions, for example, the pattern generating unit 33 first selects two prescribed messages from among messages in the same group. Then the pattern generating unit 33 determines for each word whether the word matches between the selected messages. On determining that the word does not match, the pattern generating unit 33 identifies the word as a variable portion. The pattern generating unit 33 executes such identification processing of variable portions on all combinations of any two messages in the same group.

The associating unit 34 associates a pattern with identification information of a parameter the values of which are output to a message of the pattern (hereinafter simply referred to as parameter), and stores the same in the pattern table 24 of the storage unit 35. The correspondence between a pattern and a parameter will be the relationship based on which the values of the corresponding parameter are output to a variable portion of a message that fits the pattern.

Here, a parameter of a server which outputs a log 22 including a specific message will be referred to as a parameter corresponding to the message in the following description. That is, a parameter corresponding to a message m is a parameter related to the server that has output the log 22 containing m.

In the correspondence, of the target parameters among the configuration information 21 that has been input, target parameters are focused upon one by one, and association processing that associates a pattern with a target parameter is executed, as will be described below. In addition, in the association processing between a pattern with a target parameter, the associating unit 34, for example, focuses on patterns one by one among a plurality of patterns that have been input from the pattern generating unit 33 and determines whether to associate the focused pattern with the target parameter.

In determining whether to associate a focused pattern with a target parameter, the associating unit 34 first specifies parameter values corresponding to a message that fits a pattern among the messages included in the log 22 that has been acquired by the acquisition unit 31. In other words, it can be said that the associating unit 34 specifies the values of the target parameter corresponding to messages included in a group in which the pattern was generated. Here, a message that fits a pattern indicates a message in which common portions that exclude variable portions match the pattern.

Next, the associating unit 34 compares messages in all combinations of two messages that fit the focused pattern. In the comparison of two messages, the associating unit 34 determines whether or not the match/mismatch between the variable portions in the two target messages for comparison is consistent with the match/mismatch between the values of the two target parameters each corresponding to the two target messages for comparison. When it is determined that the match/mismatch between the variable portions in the two target messages for comparison is not consistent with the match/mismatch between the values of the two target parameters each corresponding to the two target messages for comparison, the associating unit 34 determines that the target parameter does not associated with the focused pattern.

That is, the associating unit 34 first determines whether or not the variable portions of the two messages match each other in a case where the target parameter values corresponding to the two messages for comparison are different. Then, if it is determined that the variable portions of the two messages match each other for all combinations in which the target parameter values for the two respective target messages for comparison differ, the pattern associating unit 34 determines that the target parameter does not associate with the focused pattern.

When the target parameter values for the two respective target messages for comparison match each other, the associating unit 34 determines whether or not the variable portions of the two messages are different. When the associating unit 34 determines that the variable portions of the two messages are different in any combination in which the target parameter values corresponding to the two messages match each other, then the associating unit 34 determines that the target parameter does not associate with the focused pattern.

Next, the associating unit 34 determines whether or not the parameter values corresponding to all of the messages that fit the focused patterns are the same. When it is determined that parameter values of the parameters corresponding to all of the messages that fit the focused patterns are the same, the associating unit 34 determines that the presence or absence of the appearance of the focused pattern is related to the target parameter.

Finally, when it is determined that the presence or absence of the appearance of the focused pattern is related to the target parameter, or when it is not determined that the focused pattern is not associated with the target parameter, the associating unit 34 determines to associate the focused pattern with the target parameter.

When the determination to associate the focused pattern with the target parameter is made, the associating unit 34 associates the focused pattern with the target parameter and stores the result in the pattern table 24 of the storage unit 35. The associating unit 34 further stores the parameter values with respect to values in the variable portions of the pattern, or the relationship between the parameter values and the presence or absence of the appearance of a pattern in the correspondence table 25.

In this way, the associating unit 34 executes the processing of determining whether to associate a pattern with a target parameter, associating the pattern with the target parameter depending on the result of the determination, and storing the result in the pattern table 24, for all the patterns that have been input from the pattern generating unit 33.

The storage unit 35 stores the pattern table 24, the correspondence table 25, and the configuration management information 26.

Next, the processing in the learning stage will be described in detail with reference to FIGS. 4 through 14. In the description of the processing in the learning stage with reference to FIGS. 4 through 14, an example with three target parameters is provided, namely "version", "bind-address", and "innodb".

FIGS. 4A-4F illustrate an example of a combination of the configuration information 21 and the log 22 that the acquisition unit 31 acquires in the learning stage. In FIGS. 4A-4F, combinations of the configuration information 21 and the log 22 of six servers "svr01" to "svr06" are illustrated. Here, for the sake of explanation, of the messages in the log 22 of FIGS. 4A-4F, a description will be given by taking an example of the messages that are illustrated in FIGS. 5A-5D.

FIGS. 5A-5D are diagrams illustrating messages that are taken as an example in the description of the processing in the learning stage. As illustrated in FIGS. 5A-5D, the processing in the learning stage will be described by focusing on the messages "$m_1$" to "$m_8$" included in the log 22 of the four servers "svr01" to "svr04".

When combinations of the configuration information 21 and the log 22 are input from the acquisition unit 31, the classification unit 32 selects certain two messages from the messages "$m_1$"-"$m_8$" of the log 22, and calculates the similarity between the selected messages. The classification of the messages will be described hereinafter with reference to FIGS. 5 through 7. However, the method of classification of the messages described with reference to FIGS. 5 through 7 is one example, and a variety of methods can be used.

In the calculation of similarity, the classification unit 32 first aligns each of the words in the selected messages of a combination. That is, the classification unit 32 associates each of the words on a one-to-one basis between the selected messages. The classification unit 32 then determines whether the words that are associated with each other match each other.

FIG. 6A illustrates a state of comparing similarities between the messages "$m_2$" and "$m_6$". FIG. 6B illustrates a state of comparing similarities between the messages "$m_2$" and "$m_3$". As illustrated in FIG. 6A and FIG. 6B, alignment of each of the word in the messages and comparison as to whether the aligned words match each other are performed. In FIG. 6A, a word that is "2" in the word order is different. In FIG. 6B, words that are "1" to "5" in the word order are different.

After determining whether or not each of the aligned words match, the classification unit 32 calculates the similarity according to the following equation.

$$\text{Similarity} = (\text{number of matching words})/((\text{number of matching words}) + (\text{number of mismatching words}))$$

In FIG. 6A, the number of matching words is "5" and the number of mismatching words is "1". Thus, the degree of similarity between "$m_2$" and "$m_6$" is $5/(5+1) \approx 0.83$. In FIG. 6B, the number of matching words is "2" and the number of mismatching words is "5". Thus, the degree of similarity between "$m_2$" and "$m_2$" is $2/(2+5) \approx 0.29$.

Note that the method of calculating similarity between messages is not limited to the above method, and various methods may be used.

After calculating the similarities of combinations of all the messages, the classification unit 32 classifies the messages so that messages having a similarity that is equal to or greater than a predetermined threshold are included in the same group.

FIG. 7 illustrates information that summarizes the results of calculating the similarities between all the messages "$m_1$" to "$m_8$". In FIG. 7, the value of each cell indicates the similarity of the combination of messages in the columns and rows. For example, the value of the cell of column "$m_3$" of row "$m_1$" indicates the value of similarity of "$m_1$" and "$m_3$". In FIG. 7, when the value of the predetermined threshold is "0.5", the similarity of "$m_3$", "$m_5$", "$m_7$" is greater than the threshold for row "$m_1$". Also, for row "$m_2$", the similarity of "$m_4$", "$m_6$" and "$m_8$" is greater than the threshold value. The classification unit 32 then classifies the messages "$m_1$", "$m_3$", "$m_5$", and "$m_7$", which have a similarity that is greater than the threshold, into the same group, and also classifies the messages "$m_2$", "$m_4$", "$m_6$", and "$m_8$" into the same group.

Then, the pattern generating unit 33 compares the messages that have been classified into each group by the classification unit 32 to each other to specify common portions and variable portions of the messages, and generates a pattern of the messages.

Figure 8A:
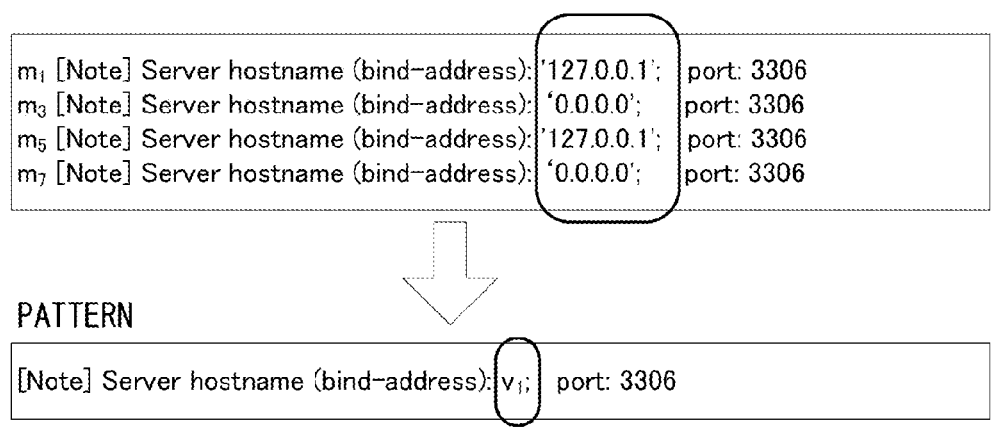
FIG. 8A is a diagram (1) explaining a state in which a pattern is generated from a message included in the same group.
Figure 8B:
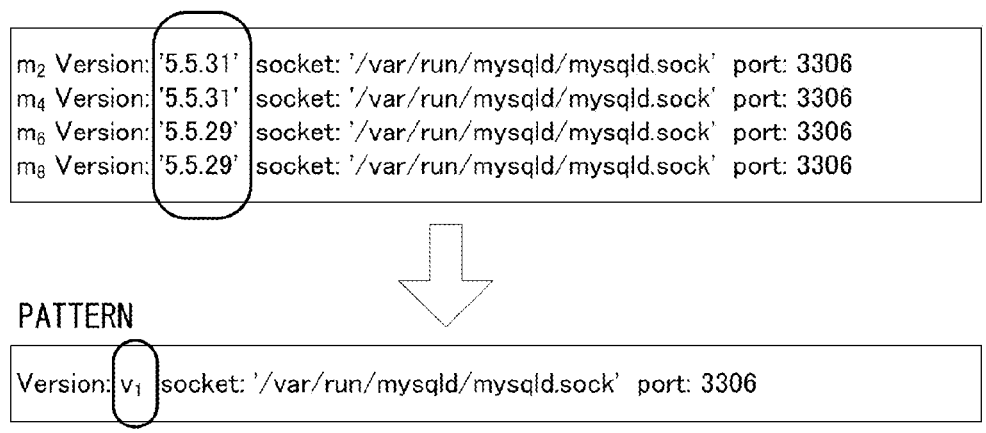
FIG. 8B is a diagram (2) explaining a state in which a pattern is generated from a message included in the same group.

FIGS. 8A and 8B are diagrams explaining a state in which a pattern is generated from messages included in the same group. FIG. 8A illustrates a state in which a pattern is generated from the messages "$m_1$", "$m_3$", "$m_5$", and "$m_7$". FIG. 8B illustrates a state in which a pattern is generated from the messages "$m_2$", "$m_4$", "$m_6$", and "$m_8$".

In FIGS. 8A and 8B, between messages, words that are common to each other and words that are different from each other exist. Here, the pattern generating unit 33 generates a pattern in which a word that is different between messages is a variable portion of the pattern.

In FIG. 8A, the pattern generating unit 33 selects, for example, "$m_2$" and "$m_3$". The pattern generating unit 33 then determines that "127.0.0.1" and "0.0.0.0" do not match between "$m_2$" and "$m_3$" and determines this portion to be a variable portion. Similarly, the pattern generating unit 33 selects every combinations of the messages in the same group, identifies portions that do not match between the selected messages, and determines these portions to be variable portions. The pattern generating unit 33 substitutes the variable portion with a predetermined variable in the group ("$v_1$" in FIG. 8A), and generates a pattern having a replaced variable and common portions. The variable portions, depending on the combination of the selected messages, may match in some cases. For example, when "$m_1$" and "$m_5$" have been selected, the variable portions match.

Similarly, in FIG. 8B, the pattern generating unit 33 selects, for example, "$m_2$" and "$m_6$". The pattern generating unit 33 then determines that "5.5.31" and "5.5.29" do not match, and determines this portion to be a variable portion. The pattern generating unit 33 replaces the variable portion with the variable "$v_1$" and generates a pattern that has a replaced variable and common portions.

FIG. 9 illustrates an example of a pattern generated when the configuration information 21 and the log 22 illustrated in FIGS. 4A-4F have been input. As illustrated in FIG. 9, when the configuration information 21 and the log 22 illustrated in FIGS. 4A-4F have been input, patterns "$t_1$" to "$t_6$" are generated. The portions indicated by "$v_1$", "$v_2$" in the patterns in FIG. 9 are variable portions. Note that patterns in which no variable portion exists such as the patterns "$t_1$" and "$t_3$" in FIG. 9 are also generated. In addition, there are also cases in which one pattern contains a plurality of variable portions, such as "$t_2$", "$t_4$", and "$t_5$".

Next, the associating unit 34 associates a pattern generated by the pattern generating unit 33 with a parameter of which a value is output to a message that fits the pattern. In the embodiment, an association table is generated to specify a pattern corresponding to each parameter and association is performed.

In the generation of the association table, the associating unit 34 first acquires from the configuration information 21 and the log 22 the value of a variable portion of a message that fits a pattern (hereinafter simply may be referred to as pattern) included in the log 22 of a server for each server and the value of a target parameter related to the server. The associating unit 34 then associates for all servers the values of the variable portions of the patterns included in the server log 22 with the values of the target parameters related to the server, and generates the association table illustrated in FIGS. 10A through 10C for each parameter. FIGS. 10A through 10C are examples of association tables related to the parameters "version", "bind-address", and "innodb". Note that these three parameters are parameters that are included in the configuration information 21 of FIG. 4A-4F.

In the association table illustrated in FIG. 10A, row items are indicated by combinations of identification information of patterns and variable portions. Note that values of these patterns and variable portions correspond to the values of FIG. 9. In addition, column items are indicated by values for the parameter "version".

For example, when considering "srv01", the value of the parameter "version" of "srv01" is "5.5.31", as illustrated in FIG. 4A. Thus, among the messages in the log 22 of "srv01", the value of a variable portion of a message that fits a pattern is stored in a cell in the column having the item "5.5.31".

For "srv01", for example, words corresponding to variable portions "$t_2$-$v_1$" and "$t_2$-$v_2$" are "127.0.0.1" and "3306", respectively. Therefore, "127.0.0.1" is stored in the cell indicated by (row item "$t_2$-$v_1$", column item "5.5.31"), "3306" is stored in the cell indicated by (row item "$t_2$-$v_2$", column item "5.5.31").

The value of the parameter "version" of "srv02" is "5.5.31". Thus, among the messages in the log 22 of "srv02", the value of a variable portion of a message that fits a pattern is stored in a cell in the column having the item "5.5.31". For "srv02", for example, words corresponding to variable portions "$t_2$-$v_1$" and "$t_2$-$v_2$" are "0.0.0.0" and "3306", respectively. Therefore, "0.0.0.0" is stored in the cell indicated by (row item "$t_2$-$v_1$", column item "5.5.31"), and "3306" is stored in the cell indicated by (row item "$t_2$-$v_2$", column item "5.5.31"). Here, in the cell indicated by (row item "$t_2$-$v_1$", column item "5.5.31"), the value of the server "srv02" being "0.0.0.0" is stored in addition to the value "127.0.0.1" of the server "srv01".

The value of the parameter "version" of "srv03" is "5.5.29". Thus, among the messages in the log 22 of "srv03", the value of a variable portion of a message that fits a pattern is stored in a cell in the column having the item "5.5.29". For "srv03", for example, words corresponding to the variable portions "$t_4$-$v_1$" and "$t_3$-$v_2$" are "5.5.29" and "3306", respectively. Therefore, "5.5.29" is stored in the cell indicated by (row item "$t_4$-$v_1$", column item "5.5.29"), and "3306" is stored in the cell indicated by (row item "$t_4$-$v_2$", column item "5.5.29").

Similarly, for the servers "srv04" to "srv06", among the messages included in the log 22 that is output by each server, the values of variable portions of messages that fit patterns are associated with values of parameters of the servers and stored in the corresponding column.

Note that a symbol "○" is stored in the row of patterns that have no variable portion and that a symbol "x" is stored when the pattern indicated in the row items does not appear in the log 22 of any server. For example, "x" is stored in the cells indicated by (row item "$t_5$-$v_1$", column item "5.5.29") and (row item "$t_5$-$v_2$", column item "5.5.29"). This indicates that the pattern "$t_5$" has not appeared in the servers in which "5.5.29" has been set as the value of the parameter "version", that is, "srv03" and "srv04".

As described above, in the example where the combinations of the configuration information 21 and the log 22 illustrated in FIG. 4A-4F are input, the associating unit 34 creates the association table illustrated in FIG. 10A in relation to the parameter "version". Also, for the parameters "bind-address" and "innodb", in the same manner as for the parameter "version", the associating unit 34 creates the association tables illustrated in FIG. 10B and FIG. 10C, respectively.

Next, the associating unit 34 specifies for each parameter the variable portions to which parameter-specific values will be output by using the created association table. The processing of specifying a variable portion to which parameter-specific values will be output will be described with reference to FIGS. 10 through 13.

In specifying a variable portion to which the parameter-specific values will be output, the associating unit 34 first determines whether or not the variable portions match when the value of the parameter is different, by using the association table of FIG. 10. For example, in FIG. 10A, when the associating unit 34 compares the column items "5.5.29" and "5.5.31", the associating unit 34 determines whether or not the values of a variable portion indicated in the same row are different. For example, in the row of row item "$t_2$-$v_2$", both values in the cell (row item "$t_2$-$v_2$", column item "5.5.31") and the cell (row item "$t_2$-$v_2$", column item "5.5.29") are "3306". Therefore, the associating unit 34 determines that the variable portion that is indicated by the row item "$t_2$-$v_2$" matches between the column items "5.5.31" and "5.5.29". When the value of the parameter is different, and if the variable portions of all the combinations are determined to match, then the associating unit 34 determines that matched variable portions are not associated with the parameter. Thus, the associating unit 34 determines that the variable portion indicated by "$t_2$-$v_2$" in FIG. 10A is not associated with the parameter "version".

In the row of row item "$t_2$-$v_1$", "127.0.0.1", "0.0.0.0" is stored in the cell of (row item "$t_2$-$v_1$", column item "5.5.31") and "127.0.0.1", "0.0.0.0" is stored in the cell of (row item "$t_2$-$v_1$", column item "5.5.29"). In this case, the associating unit 34 determines that the variable portion is different in the combination of "127.0.0.1" in (row item "$t_2$-$v_1$", column item "5.5.31") and "0.0.0.0" in (row item "$t_2$-$v_1$", column item "5.5.29").

Also, for patterns not having a variable portion (stored in the association table with the symbol "○", such as "$t_1$", for example), the associating unit 34 determines that these patterns are not associated with the target parameter.

The associating unit 34 makes a determination for all the row items in the same way and generates, on the basis of the association table of FIG. 10, the association table of FIG. 11 for row items that have been determined to be not associated with the target parameter and which are stored therein to that effect. In the same way as for the parameter "version", the associating unit 34 also performs generation for the parameters "bind-address" and "innodb" in FIGS. 11B and 11C on the basis of FIGS. 10B and 10C.

Next, the associating unit 34 determines whether the variable portions are different when the values of the parameters are the same, using the association table of FIGS. 11A through 11C. That is, in FIGS. 11A through 11C, the associating unit 34 refers to all of the cells and determines whether a plurality of different values are stored in one cell. When it is determined that different values have been stored in one cell, the associating unit 34 determines that the variable portion indicated by the row item of the determined cell is not associated with the target parameter and stores the variable portion in the association table.

For example, in FIG. 11A, in the cell indicated with (row item "$t_2$-$v_1$", column item "5.5.31") the values of "127.0.0.1" and "0.0.0.0" have been stored. Thus, the associating unit 34 determines that different values have been stored in one cell and determines that the variable portion indicated by the row item "$t_2$-$v_1$" is not associated with the target parameter.

Figures 12A, 12B, 12C:
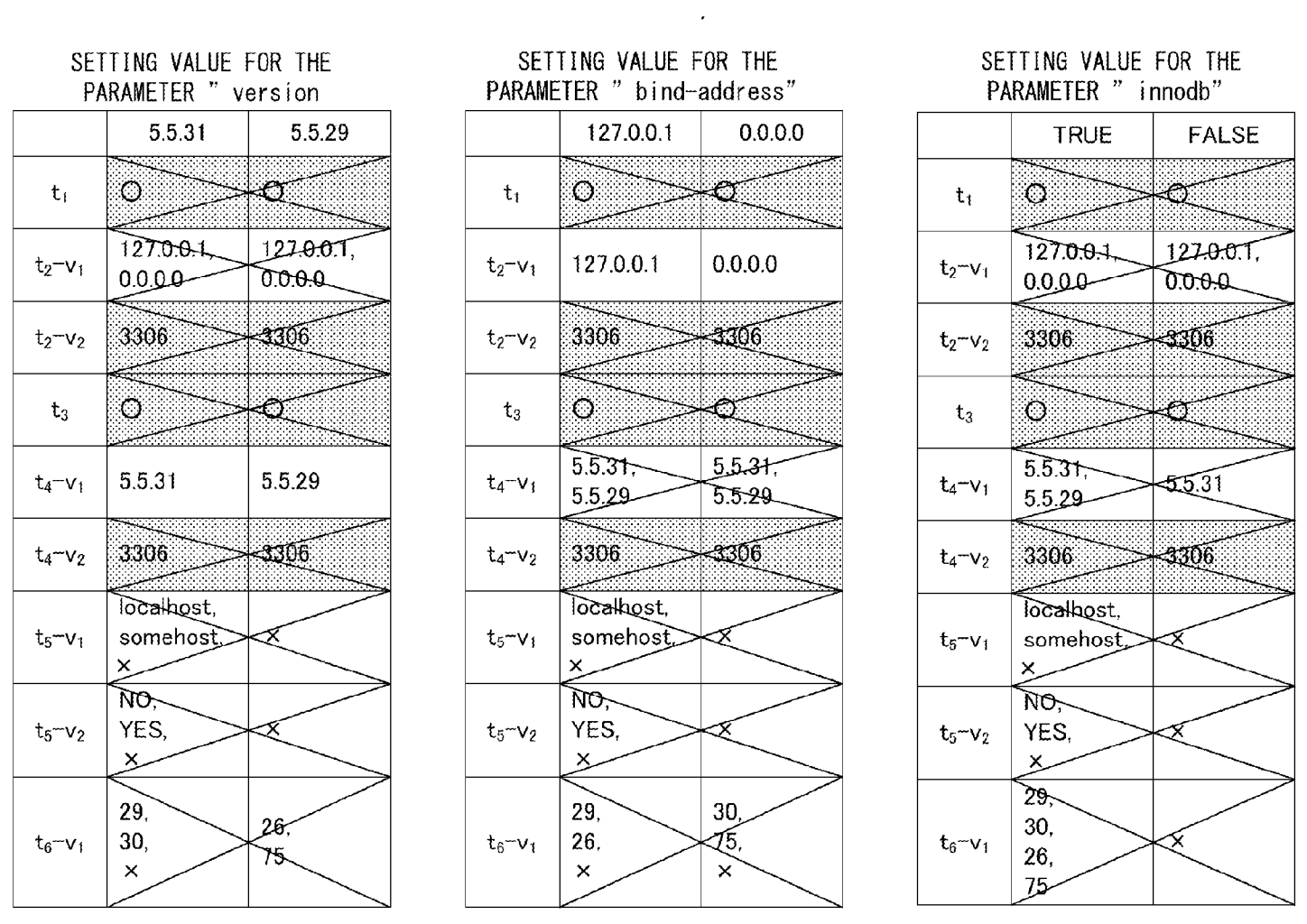

Determination is performed in a similar way for all cells, and the associating unit 34 generates, on the basis of the association tables of FIGS. 11A through 11C, the association tables of FIGS. 12A through 12C for the row items that have been determined not to correspond to the target parameter and which are stored therein to that effect.

Next, when the values of the parameters are different, the associating unit 34 determines whether or not the appearance of messages that fit patterns changes, using the association tables of FIGS. 12A through 12C. That is, when the associating unit 34 compares different columns in the same row, it determines whether or not the symbol "x" is stored only in one cell and a value other than "x" is stored in another cell.

For example, in FIG. 12C, in the cell of (row item "$t_6$-$v_1$", column item "TRUE"), a value other than "x" ("29", "30", "26", "75") has been stored ("x" has not been stored) and in the cell of (row item "$t_6$-$v_1$", column item "FALSE"), "x" has been stored. Thus, in relation to the parameter "innodb", when the value of the parameter is different, the associating unit 34 determines that the appearance of messages that fit the pattern "$t_6$" changes. Then, the associating unit 34 determines that the presence or absence of the appearance of the pattern indicated in the row item of the determined cell is related to the target parameter, and generates, on the basis of the association tables of FIGS. 12A through 12C, the association tables of FIGS. 13A through 13C for the row items that have been determined to be related to the target parameter and which are stored therein to that effect. In FIG. 13C, as compared to FIG. 12C, a record indicating that "$t_6$-$v_1$" is not related to the target parameter ("x" crossing out the entirety of "$t_6$-$v_1$" row) is deleted. This means that, a variable portion the values of which are different when the values of a parameter are the same is not determined that the variable portion is non-assciated (i.e., not associated) with the parameter if the variable portion for which the appearance of the corresponding pattern in messages changes when the values of the parameter are different.

In the manner described with reference to FIGS. 10 through 13, the associating unit 34 specifies for each parameter a variable portion to which parameter-specific values will be output. That is, the associating unit 34 specifies a variable portion indicated by a row item that was not determined to be non-associated with a target parameter in the association tables as a variable portion to which parameter-specific values of the target parameter will be output.

As illustrated in FIGS. 13A through 13C, "t4-v1" for the parameter "version", "t2-v1" for the parameter "bind-address", and "t6" for the parameter "innodb" are patterns or variable portions associated with each parameter.

Next, the associating unit 34 associates each parameter with the variable portions to which parameter-specific values will be output and stores these in the pattern table 24. FIG. 14 illustrates an example of the pattern table 24. The pattern table 24 includes data items of an ID 51, a pattern 52, a position of variable portion 53, a position associated with parameter 54, a correspondence table ID 55, and a parameters 56. The ID 51 is a management number for managing the correspondence between patterns and parameters. Note that the ID 51 may not be included in the pattern table 24. The pattern 52 is a pattern generated by the pattern generating unit 33. The position of variable portion 53 indicates the position of a variable portion in the pattern 52 as a position from the beginning of words included in the character string of the pattern 52. The position associated with parameter 54 indicates a variable portion to which parameter-specific values are output from among the variable portions included in the pattern 52. The correspondence table ID 55 is identification information of a correspondence table 25 indicating a value of a parameter with respect to the value of the variable portion or a relation between the presence or absence of appearance and a value of a parameter. The correspondence table 25 will be described later. The parameter 56 is a parameter associating with the pattern 52. Note that the values stored in each entry of the pattern table 24 are assumed to be associated with each other.

As illustrated in FIG. 13A, with respect to the parameter "version", it is specified that a value is output to the variable portion which is indicated by "$t_4$-$v_1$". In this case, the associating unit 34 generates an entry "1" for the ID 51, stores the pattern indicated by "$t_4$" in the pattern 52 in the entry, and stores "version" in the parameter 56. The associating unit 34 then stores in the position of variable portion 53 values indicating the positions of "$t_4$-$v_1$" and "$t_4$-$v_2$" which are variable portions of "$t_4$" with the positions of the words from the beginning of the character string of the pattern. In the example of FIG. 14, the position of a word from the beginning of the character string of a pattern is indicated by a value of the number assigned to each word in an ascending order from "0" assigned to the first word of the pattern. The associating unit 34 then stores in the position associated with parameter 54 the position of "$t_4$-$v_1$" that has been specified as a variable portion to which a parameter-specific value of the parameter "version" is output. Since the parameter "version" and the presence or absence of the appearance of the pattern are not related, the associating unit 34 stores "–" in the correspondence table ID 55.

With respect to the parameter "innodb", as illustrated in FIG. 13C, the presence or absence of the appearance of the pattern indicated by "$t_6$" is determined to be related to the parameter "innodb". Then, the associating unit 34 generates the entry "3" for the ID 51 and stores the pattern indicated by "$t_6$" in the pattern 52 in the entry and stores "innodb" in the parameter 56. The associating unit 34 then stores in the position of variable portion 53 a value of the position of "$t_6$-$v_1$" which is the variable portion of "$t_6$" indicated by the position of the word from the beginning of the character string of the pattern. The associating unit 34 then generates the correspondence table 25 and allocates to the generated correspondence table 25 a correspondence table ID which is identification information for uniquely identifying the generated correspondence table 25 among a plurality of correspondence tables 25 stored in the storage unit 35.

FIG. 14B illustrates an example of the correspondence table 25. The correspondence table ID "5" is allocated to the correspondence table 25 in FIG. 14B. The correspondence table 25 of FIG. 14B stores the presence or absence of appearance of a message and the value of the parameter in association with each other. Note that the values stored in each entry in the correspondence table 25 are assumed to be associated with each other. When a message that fits the pattern appears, the associating unit 34, as illustrated in FIG. 13C, associates the appearance with the value of the parameter "innodb" being "TRUE" and stores this association in the correspondence table 25. In addition, when a message that fits the pattern does not appear, the associating unit 34 associates the absence with the value of the parameter "innodb" being "FALSE" and stores this association in the correspondence table 25. In FIG. 14B, the symbol "○" in the message column indicates that the message appears, and the symbol "x" in the message column indicates that the message does not appear.

The correspondence table 25 in FIG. 14B illustrates an example where the presence or absence of appearance of a message and the value of a parameter are stored in association with each other, but the values of a variable portion and the values of a parameter may be stored in association with each other.

After generating the correspondence table 25, the associating unit 34 stores the generated correspondence table ID of the correspondence table 25 in the correspondence table ID 55. In a case where the presence or absence of appearance of a message and the values of a parameter are related to each other, the associating unit stores "–" in the position associated with parameter 54. In this way, the associating unit 34 generates the pattern table 24 and the correspondence table 25. The associating unit 34 then stores the generated pattern table 24 and the generated correspondence table 25 in the storage unit 35.

Next, a configuration related to the detection stage will be described. In FIG. 3, the acquisition unit 31, the storage unit 35, the program generating unit 36, and the application unit 37 are related to the detection stage, and the detection stage receives information of the operation log 23, the pattern table 24 and the correspondence table 25 as an input and outputs information of the configuration management information 26.

The acquisition unit 31 acquires the operation log 23, and outputs the same to the application unit 37.

The program generating unit 36 extracts a message that fits a pattern from the operation log 23 by using the pattern table 24 and the correspondence table 25 to generate a detection program for detecting a change in the value of a parameter. The program generating unit 36 then outputs the generated detection program to the application unit 37.

The application unit 37 applies the operation log 23 to the detection program and detects a change in the value of the parameter. After detecting a change in the value of the parameter, the application unit 37 reflects the contents after the change in the value of the parameter in the configuration management information 26.

The latest value of configuration information of each server is stored and managed in the configuration management information 26.

Next, processing of the detection stage will be described in detail with reference to FIGS. 15 through 17. Here, detection processing for changes in the parameter "version" and the parameter "innodb" will be described by using the pattern table 24 of FIG. 14A and the correspondence table 25 of FIG. 14B.

The program generating unit 36 acquires the pattern table 24 and the correspondence table 25 stored in the storage unit 35. Here, the program generating unit 36 acquires the pattern table 24 of FIG. 14A and the correspondence table 25 of FIG. 14B. Then, the program generating unit 36 generates detection programs to detect changes in the parameter "version" and the parameter "innodb". FIG. 15 is a diagram explaining the generation of a detection program for the parameter "version". FIG. 16 is a diagram explaining the generation of a detection program for the parameter "innodb".

First, referring to FIG. 15, the generation of the program to detect a change in the parameter "version" will be described. The program generating unit 36 specifies a row in which the parameter 56 is "version" from the pattern table 24 of FIG. 14A, and reads in the specified row. FIG. 15A describes the row in which the parameter 56 is "version", which has been read by the program generating unit 36. Then, the program generating unit 36 generates the detection program described in FIG. 15B by using information in the row that has been read. FIG. 15B is an example of a detection program for the parameter "version".

The detection program of FIG. 15B is written in the script language (in this case, perl), for example. Note that numerals following "#" in FIG. 15B and FIG. 16C represent row numbers, and are irrelevant to actual processing. In the detection program, a message is read in from the operation log 23 in the first row, and processing is executed for determining whether or not the read-in message matches the character string in the pattern 52. Note that, in the first row, a message read from the operation log 23 is assumed to be stored in "$str". If it is determined that the read-in message matches the character string in the pattern 52, processing is executed for extracting the message that has been determined to match the character string. Next, in the second row, processing is executed such that the extracted message is resolved into words (units in the character string separated by spaces), and words at positions indicated by the position of variable portion 53 are extracted. The extracted words here are parameter-specific values at a point in time when the message is output to the operation log 23. Then, in the third row, processing is executed for reflecting the values of the extracted words as parameter-specific values of the parameter "version" in the configuration management information 26.

In the processing for reflecting values in the configuration management information 26, note that the values of the extracted words are compared with the parameter-specific values that have already been stored in the configuration management information 26 and, if the values are different as a result of the comparison, it is determined that the parameter-specific values are to be updated. Then, if it is determined that the parameter-specific values are to be updated, the extracted values are reflected in the values of the parameter "version" of the configuration management information 26.

Next, the generation of a program for detecting changes in the parameter "innodb" will be described with reference to FIG. 16. First, the program generating unit 36 specifies a row in which the parameter 56 is "innodb" from the pattern table 24 of FIG. 14A, and reads in the specified row. FIG. 16A describes the row in which the parameter 56 is "innodb", which has been read by the program generating unit 36. Then, the program generating unit 36 determines whether or not values are stored in the correspondence table ID 55 of the read-in row. When it is determined that values are stored in the correspondence table ID 55, the program generating unit 36 reads in the correspondence table 25 of FIG. 16B identified in the correspondence table ID 55. The program generating unit 36 then generates the detection program illustrated in FIG. 16C using information of the read-in row and the correspondence table 25. Here, the value of the parameter "innodb" is related to the presence or absence of a message as illustrated in FIG. 16B.

In the detection program illustrated in FIG. 16C, first, in the first row, as pre-processing before the operation log 23 is read in, initialization processing is executed such that a value of a determination flag used for determining the presence or absence of appearance of a message that fits the pattern 52 is set to "0". Then, in the third row, processing is executed to read in a message from the operation log 23 and to determine whether or not the read-in message matches the character string of the pattern 52. Next, when it is determined that the read-in message matches the character string of the pattern 52, in the fourth row, processing is executed to determine that a value of the parameter ("TRUE") that corresponds to the case in which a message appears as described in FIG. 16B is the current value of the parameter. Here, more precisely, the current value of the parameter is a value of the parameter at a point in time when the message is output to the operation log 23. Then, processing is executed to reflect the value of the parameter ("TRUE") that corresponds to the case in which a message appears in the configuration management information 26.

Thereafter, in the fifth row, processing is executed to set the value of the determination flag to "1". After the completion of processing to read in all logs and to determine whether or not the read-in message match a character string of a pattern, in the eighth row, processing is executed to determine whether or not the determination flag is "0" as post-processing. When it is determined that the value of the determination flag is "0", in the ninth row, processing is executed to determine that the value of the parameter ("FALSE") that corresponds to the case in which a message does not appear as described in FIG. 16B is the current value of the parameter. Then, processing is executed to reflect the value of the parameter ("FALSE") that corresponds to the case in which a message does not appear in the configuration management information 26.

As described above, the program generating unit 36 generates detection programs to detect changes in the parameter "version" and the parameter "innodb". Similarly, the program generating unit 36 generates a detection program to detect changes in the parameter "bind-address". Next, the application unit 37 applies the operation log 23 to the detection programs. That is, the application unit 37 executes the detection programs with the operation log 23 as input.

Figures 17A, 17B, 17C:
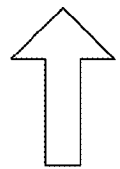
FIGS. 17A-17C are diagrams illustrating how an operational log detection program is applied.

FIG. 17 is a diagram illustrating a state in which the operation log is applied to the detection programs. FIG. 17A illustrates an example of an "mysqld" log 22 that is the operation log of the server "srv04". When the configuration management information 26 of "mysqld" of the server "srv04" before the operation log 23 is applied is as illustrated in FIG. 17B, the configuration management information 26 is updated as illustrated in FIG. 17C after the operation log 23 illustrated in FIG. 17A is applied to the detection programs illustrated in FIGS. 15B and 16C.

Figure 18:
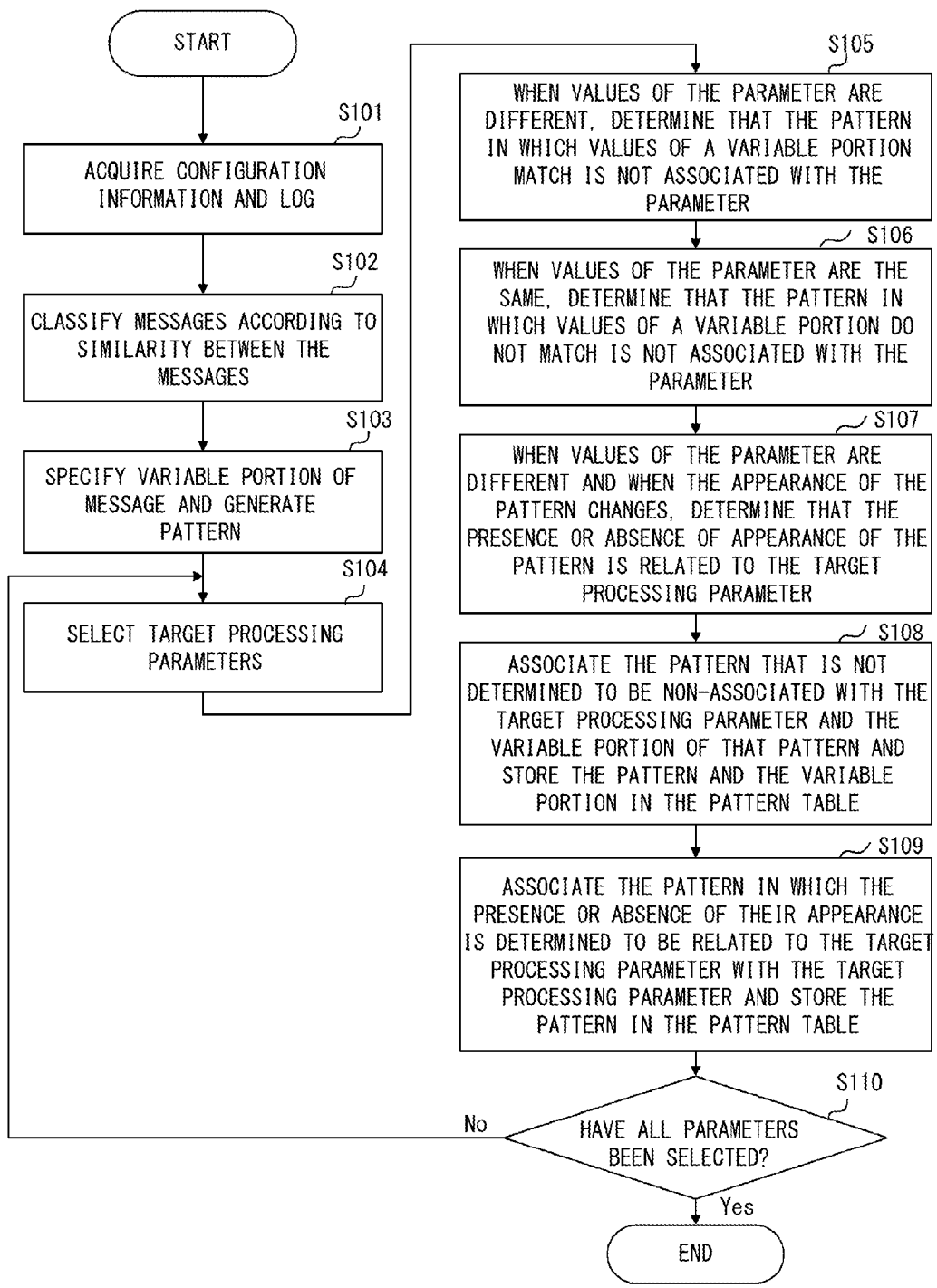
FIG. 18 is a flowchart illustrating the processing of the learning stage.

FIG. 18 is a flowchart illustrating processing in the learning stage. In FIG. 18, the acquisition unit 31 first acquires the configuration information 21 and the log 22 (S101).

Next, the classification unit 32 classifies messages into a plurality of groups in accordance with similarity between the messages output to the log 22 (S102). Then, the pattern generating unit 33 compares the messages with each other included in each group classified by the classification unit 32 and specifies common portions and variable portions of the messages to generate patterns of the messages (S103).

Next, the associating unit 34 selects one of target parameters as a target processing parameter (S104).

Then, in a case where values of the target processing parameter are different, the associating unit 34 determines that a pattern in which values of a variable portion match is not associated with the target processing parameter (S105).

Next, in a case where values of the target processing parameter are the same, the associating unit 34 determines that a pattern in which values of variable portion do not match is not associated with the target processing parameters (S106).

Next, if values of the target processing parameters are different and if the appearance of the patterns changes, the associating unit 34 determines that the presence or absence of the appearance of the patterns is related to the target processing parameters (S107).

The associating unit 34 then associates patterns and their variable portions which are not determined to be non-associated with the target processing parameter in S105 and S106 from among the patterns generated in S103 with the target processing parameter, and stores them in the pattern table 24 (S108).

Next, the associating unit 34 associates patterns in which the presence or absence of their appearance is determined to be related to the target processing parameter from among the patterns generated in S103 with the target processing parameter, and stores the patterns associated with the target processing parameters in the pattern table 24 (S109). Here, the value of the target processing parameter of a server which has output the log 22 including the associated patterns is stored in the correspondence table 25 as a value in the case in which the patterns appear, and values of the target processing parameter of the other servers are stored in the correspondence table 25 as values in the case in which the patterns do not appear.

Then, the associating unit 34 determines whether or not all parameters of the target parameter have been selected in S104 (S110). If the associating unit 34 determines that not all parameters of the target parameter have been selected (No in S110), the associating unit 34 shifts the processing to S104 and selects an unselected parameter. If it is determined that all parameters of the target parameter have been selected in S104 (Yes in S110), the processing is terminated.

FIG. 19 is a flowchart illustrating in detail processing in S105 in FIG. 18 for determining that a pattern in which variable portions match when values of the target processing parameter are different is non-associated with the target processing parameter.

In FIG. 19, the associating unit 34 first selects one of the patterns generated in S103 of FIG. 18 as a target processing pattern (S201).

Next, the associating unit 34 extracts messages that fit the target processing pattern from the log 22 of each of two servers in a combination of any two servers with different values of the target processing parameter (S202).

Then, the associating unit 34 determines whether or not values corresponding to a variable portion of the target processing pattern match between the two extracted messages (S203).

When it is determined that the values corresponding to the variable portion of the target processing pattern do not match (No in S203), the associating unit 34 executes the following processing. That is, the associating unit 34 determines whether or not processing has been executed for extracting messages from all combinations of two servers with different values of the target processing parameter (S204). When it is determined that the processing for extracting messages has not been executed in any of the combinations of two servers with different values of the target processing parameter (No in S204), the associating unit 34 shifts the processing to S202 and executes the processing of S202 in unprocessed combinations.

On the other hand, when it is determined that the processing for extracting messages has been executed in S202 in all combinations of two servers with different values of the target processing parameter (Yes in S204), the associating unit 34 shifts the processing to S206.

On the other hand, if the associating unit 34 determines in S203 that corresponding values in a variable portion of the target processing pattern match between messages (Yes in S203), the associating unit 34 determines that the target processing pattern is not associated with the target processing parameter (S205).

Next, the associating unit 34 determines in S201 whether or not all patterns generated in S103 have been selected as a target processing pattern (S206). When the associating unit 34 determines that any of the patterns generated in S103 has not been selected as the target processing pattern (No in S206), the associating unit 34 shifts the processing to S201 and selects an unselected pattern. When all the patterns generated in S103 have been selected as the target processing pattern (Yes in S206), the processing is terminated.

Note that, when a message is not extracted from either one or both of the servers in S202, the associating unit 34 also determines in S203 that corresponding values in a variable portion of the target processing pattern do not match.

Figure 20:
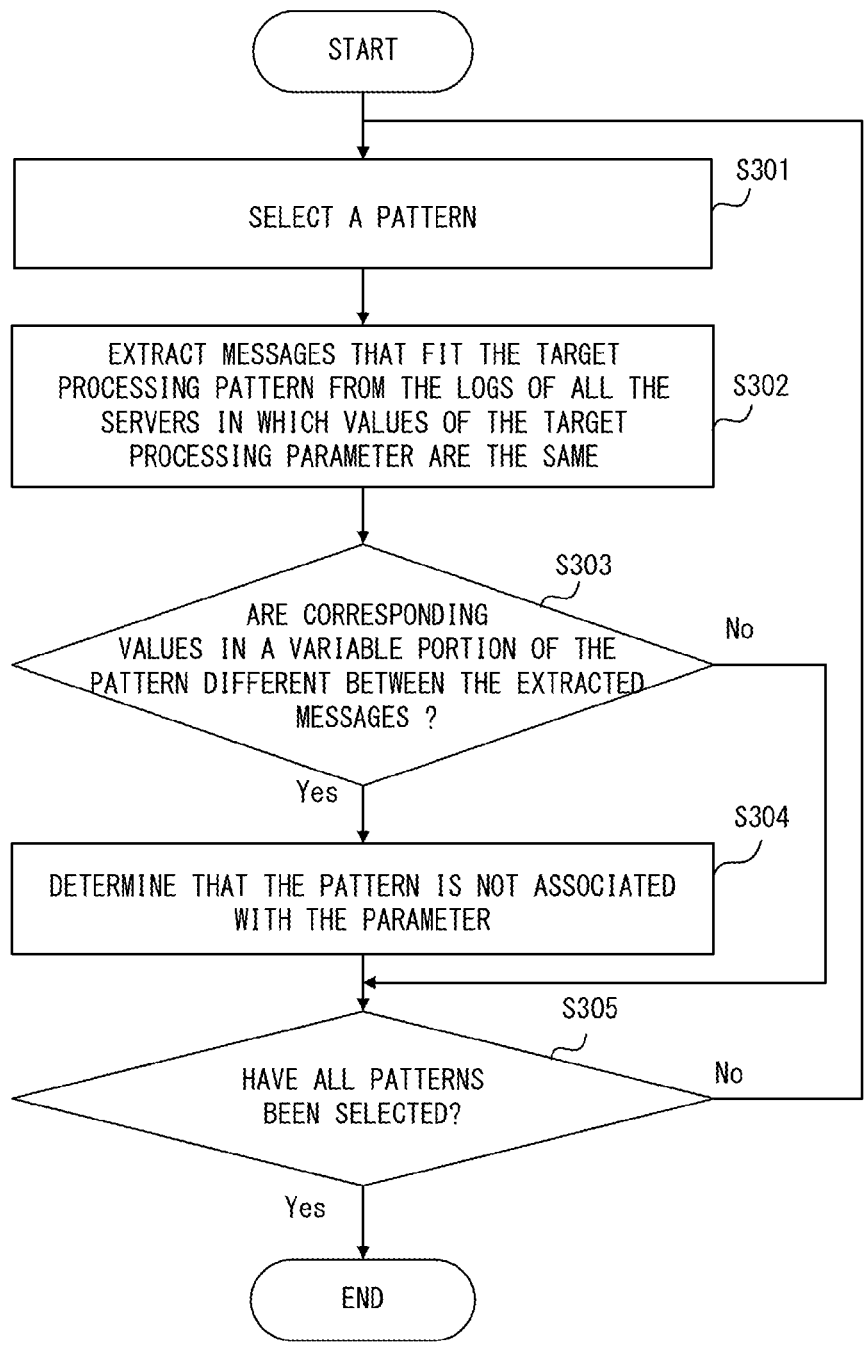
FIG. 20 is a flowchart illustrating in detail processing for determining that a pattern in which values in a variable portion are different when values of the target processing parameter match is not associated with the target processing parameter.

FIG. 20 is a flowchart illustrating in detail processing in S106 of FIG. 18 for determining that a pattern in which values in a variable portion are different when values of the target processing parameter match is not associated with the target processing parameter.

In FIG. 20, the associating unit 34 first selects one of the patterns generated in S103 of FIG. 18 as a target processing pattern (S301).

Next, the associating unit 34 extracts messages that fit the target processing pattern from the logs 22 of all the servers in which values of the target processing parameter are the same (S302).

Then, the associating unit 34 determines whether or not corresponding values in a variable portion of the target processing pattern are different between the extracted messages (S303). If the associating unit 34 determines that the corresponding values in a variable portion of the target processing pattern match between the extracted messages (No in S303), the associating unit 34 shifts the processing to S305.

On the other hand, if the associating unit 34 determines that the corresponding values in a variable portion of the target processing pattern are different between the extracted messages (Yes in S303), the associating unit 34 determines that the target processing pattern is not associated with the target processing parameter (S304).

Next, the associating unit 34 determines in S301 whether or not all patterns generated in S103 have been selected as a target processing pattern (S305). When it is determined that any of the patterns generated in S103 has not been selected as the target processing pattern (No in S305), the associating unit 34 shifts the processing to S301 and selects an unselected pattern. When all the patterns generated in S103 have been selected as the target processing pattern (Yes in S305), the processing is terminated.

Figure 21:
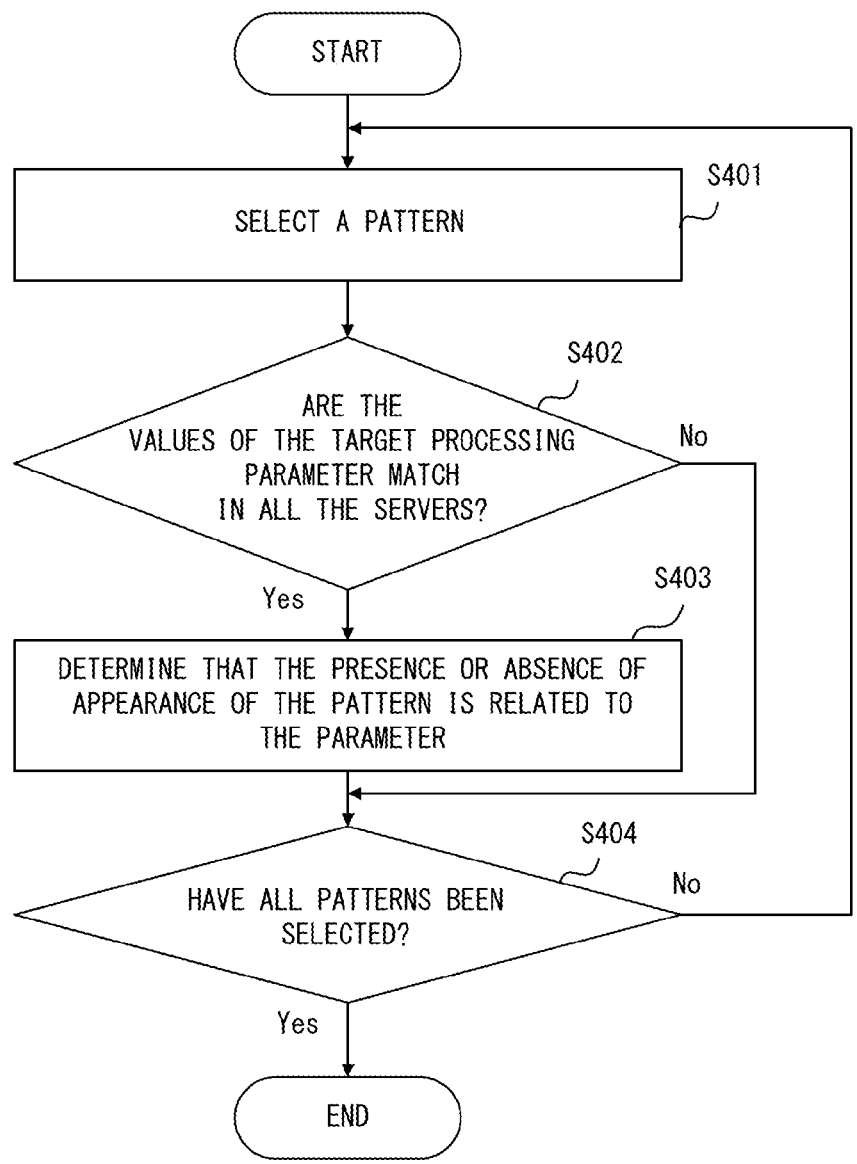
FIG. 21 is a flowchart illustrating in detail processing for determining that the presence or absence of appearance of a pattern is related to a target processing parameter when values of the target processing parameter are different and the appearance of the pattern changes.

FIG. 21 is a flowchart illustrating in detail processing in S107 of FIG. 18 for determining that the presence or absence of appearance of a pattern is related to a target processing parameter when values of the target processing parameter are different and the appearance of the pattern changes.

In FIG. 21, the associating unit 34 first selects one of the patterns generated in S103 of FIG. 18 as a target processing pattern (S401).

Next, the associating unit 34 determines whether or not values of the target processing parameter match in all the servers that have output the logs 22 including messages that fit the target processing pattern (S402). When it is determined that the values of the target processing parameter do not match in any of the servers that have output the logs 22 including messages that fit the target processing pattern (No in S402), the associating unit 34 shifts the processing to S404.

On the other hand, when it is determined that the values of the target processing parameter match in all servers that have output the logs 22 including messages that fit the target processing pattern (Yes in S402), the associating unit 34 determines that the presence or absence of appearance of the target processing pattern is related to the target processing parameter (S403).

Next, the associating unit 34 determines in S401 whether or not all patterns generated in S103 have been selected as a target processing pattern (S404). When it is determined that any of the patterns generated in S103 has not been selected as the target processing pattern (No in S404), the associating unit 34 shifts the processing to S401 and selects an unselected pattern. When it is determined that all the patterns generated in S103 have been selected as the target processing pattern (Yes in S404), the processing is terminated.

FIG. 22 is a flowchart illustrating processing in the detection stage.

In FIG. 22, the program generating unit 36 first acquires the pattern table 24 and the correspondence table 25 stored in the storage unit 35 and generates a detection program to detect an update of a parameter (S501). Next, the application unit 37 executes the detection program so that a value of a determination flag used for the determination of the presence or absence of appearance of a message that fits a pattern is initialized to "0", for example, as pre-processing (S502).

Next, the application unit 37 reads in one of messages in the operation log 23 (S503). Then, the application unit 37 determines whether or not the read-in message fits a pattern (S504). If the application unit 37 determines that the read-in message does not fit any pattern (Yes in S504), the processing shifts to S506.

On the other hand, in S504, when it is determined that the read-in message fits a pattern (No in S504), the application unit 37 updates a value of a parameter in the configuration management information 26 in accordance with the message that is determined to fit a pattern (S505). Further, the application unit 37 updates the value of the determination flag initialized in S502 to "1", for example. In updating a value of a parameter in the configuration management information 26, the application unit 37 compares the value of the parameter after the update with the value of the parameter before the update stored in the configuration management information 26. Then, when the values are different as a result of the comparison, the application unit 37 determines that the value of the parameter has been updated, and as a result, it detects the update of the value of the parameter.

Next, the application unit 37 determines whether or not all messages included in the operation log 23 have been read in S503 (S506). When it is determined that any of the messages have not been read in the operation log 23 in S503 (No in S506), the application unit 37 shifts the processing to S503.

On the other hand, when it is determined that all the messages in the operation log 23 have been read in S503 (Yes in S506), the application unit 37 executes update processing of a parameter that is related to the presence or absence of appearance of messages that fit a pattern as post-processing (S507). More specifically, when a parameter is related to the presence or absence of appearance of messages, the application unit 37 determines whether or not the value of the determination flag is "0". When it is determined that the value of the determination flag is "0", the application unit 37 updates values of the parameter in the configuration management information 26 based on the correspondence table 25, and the processing is terminated.

Next, a hardware configuration of the configuration information management apparatus 20 will be described. FIG. 23 illustrates an example of the hardware configuration of the configuration information management apparatus 20.

In FIG. 23, the configuration information management apparatus 20 includes a CPU (Central Processing Unit) 501, a memory 502, a storage device 503, a reading-out device 504, and a communication interface 505. The CPU (Central Processing Unit) 501, the memory 502, the storage device 503, the reading-out device 504, and the communication interface 505 are connected to each other through a bus.

The CPU 501 of the configuration information management apparatus 20 uses the memory 502 to execute a program describing the procedures of the above-described flowcharts so as to provide a part or all of functions in the classification unit 32, the pattern generating unit 33, the associating unit 34, the program generating unit 36 and the application unit 37.

The memory 502 is a semiconductor memory, for example, and is constituted to include a RAM (Random Access Memory) area and a ROM (Read Only Memory) area. The storage device 503 is a hard disc, for example. Note that the storage device 503 can be a semiconductor memory such as a flash memory. Alternatively, the storage device 503 can be an external recording device. The storage device 503 provides a part or all of functions of the storage unit 35.

The reading-out device 504 accesses a removable memory medium 550 in accordance with instructions of the CPU 501. The removable memory medium 550 is realized by a semiconductor device (USB memory etc.), a medium in which information is input or output by a magnetic effect (magnetic disc, etc.), a medium in which information is input or output by an optical effect (CD-ROM, DVD, etc.), and the like. Note that the reading-out device 504 may not be included in the configuration information management apparatus 20.

The communication interface 505 transmits/receives data through a network in accordance with instructions of the CPU 501. The communication interface 505 provides a part or all of functions of the acquisition unit 31.

The programs of the embodiments are provided to the configuration information management apparatus 20 in the following forms:
(1) Installed in the storage device 503 in advance;
(2) Provided by the removable memory device 550; or
(3) Provided from a program server (not illustrated) through the communication interface 505.

Further, a portion of the configuration information management apparatus 20 of the embodiments can be realized by hardware. Alternatively, the configuration information management apparatus 20 of the embodiments can be realized by a combination of software and hardware.

In order to acquire configuration information, it is also possible to specify a position of a parameter of the configuration information from description patterns in files in which the configuration information is written. However, such scripts to specify a position of a parameter are complex because the scripts need to be generated so as to conform to software and an OS (Operating System). On the other hand, in the embodiments, the configuration information management apparatus stores a parameter in association with a pattern of messages to which the parameter is output based on combinations of configuration information and logs of multiple servers. This facilitates the generation of a program to detect update of configuration information. Furthermore, in the embodiments, the configuration information management apparatus extracts messages that fit a stored pattern from among messages output to the operation log and specifies a value of a parameter from the extracted messages. Thus, in the embodiments, it is possible to automatically detect changes in configuration information from logs of a system in operation without imposing a load on the configuration information management apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process comprising:

acquiring configuration information and first log data with respect to a first device and configuration information and second log data with respect to a second device, the first device and the second device being included in a plurality of devices which constitute an information processing system;

classifying a plurality of messages included in the first log data and the second log data in accordance with a similarity between the messages to generate a message pattern including a variable portion that is different between the classified messages;

storing in a message pattern storage area in a storage the message pattern in association with the configuration information when one of a first case and a second case occurs, the first case being a case in which a value of the configuration information of the first device matches a corresponding value of the configuration information of the second device and in which a value corresponding to the variable portion of the message pattern in the first log data matches a value corresponding to the variable portion of the message pattern in the second log data, the second case being a case in which the value of the configuration information of the first device does not match the corresponding value of the configuration information of the second device and in which the value corresponding to the variable portion of the message pattern in the first log data does not match the value corresponding to the variable portion of the message pattern in the second log data;

acquiring configuration information with respect to one of the plurality of devices;

storing the configuration information of the one of the plurality of devices in a configuration information storage area in the storage;

acquiring another piece of log data with respect to the one of the plurality of devices;

determining whether the stored message pattern is included in the another piece of log data that has been acquired;

extracting, from the another piece of log data that has been acquired, a value of the variable portion of the stored message pattern when it is determined that the stored message pattern is included in the another piece of log data that has been acquired and when a value of the stored configuration information of the one of the plurality of devices is different from the value of the variable portion of the stored message pattern in the another piece of log data that has been acquired; and outputting the extracted value to the storage to update the value of the stored configuration information of the one of the plurality of devices to the extracted value.

2. The non-transitory computer-readable recording medium according to claim 1, the process further comprising:

acquiring configuration information and third log data with respect to a third device, wherein the classifying classifies a plurality of messages included in the first log data, the second log data and the third log data in accordance with a similarity between the messages to generate a message pattern including a variable portion that is different between the classified messages, and the storing stores the message pattern in association with the configuration information in a case in which a value of the configuration information of the first device is different from a corresponding value of the configuration information of the second device and a value of the configuration information of the first device matches a corresponding value of the configuration information of the third device, when a value corresponding to the variable portion of the message pattern in the first log data is different from a value corresponding to the variable portion of the message pattern in the second log data and when a value corresponding to the variable portion of the message pattern in the first log data matches a value corresponding to the variable portion of the message pattern in the third log data.

3. The non-transitory computer-readable recording medium according to claim 1, wherein the storing stores the variable portion in association with the configuration information when match or mismatch between a value of the configuration information of the first device and a corresponding value of the configuration information of the second device is consistent with match or mismatch between a value corresponding to the variable portion of the message pattern in the first log data and a value corresponding to the variable portion of the message pattern in the second log data.

4. A configuration information management method executed by a computer, the method comprising:

acquiring configuration information and first log data with respect to a first device and configuration information and second log data with respect to a second device, the first device and the second device being included in a plurality of devices which constitute an information processing system;

classifying a plurality of messages included in the first log data and the second log data in accordance with a similarity between the messages to generate a message pattern including a variable portion that is different between the classified messages;

storing in a message pattern storage area in a storage the message pattern in association with the configuration information when one of a first case and a second case occurs, the first case being a case in which a value of the configuration information of the first device matches a corresponding value of the configuration information of the second device and in which a value corresponding to the variable portion of the message pattern in the first log data matches a value corresponding to the variable portion of the message pattern in the second log data, the second case being a case in which the value of the configuration information of the first device does not match the corresponding value of the configuration information of the second device and in which the value corresponding to the variable portion of the message pattern in the first loci data does not match the value corresponding to the variable portion of the message pattern in the second log data;

acquiring configuration information with respect to one of the plurality of devices;

storing the configuration information of the one of the plurality of devices in a configuration information storage area in the storage;

acquiring another piece of log data with respect to the one of the plurality of devices;

determining whether the stored message pattern is included in the another piece of log data that has been acquired;

extracting, from the another piece of log data that has been acquired, a value of the variable portion of the stored message pattern when it is determined that the stored message pattern is included in the another piece of log data that has been acquired and when a value of the stored configuration information of the one of the plurality of devices is different from the value of the variable portion of the stored message pattern in the another piece of log data that has been acquired; and outputting the extracted value to the storage to update the value of the stored configuration information of the one of the plurality of devices to the extracted value.

5. An information processing apparatus comprising:

a storage; and a processor that executes a process including:

acquiring configuration information and first log data with respect to a first device and configuration information and second log data with respect to a second device, the first device and the second device being included in a plurality of devices which constitute an information processing system;

classifying a plurality of messages included in the first log data and the second log data in accordance with a similarity between the messages to generate a message pattern including a variable portion that is different between the classified messages;

storing in a message pattern storage area in the storage the message pattern in association with the configuration information when one of a first case and a second case occurs, the first case being a case in which a value of the configuration information of the first device matches a corresponding value of the configuration information of the second device and in which a value corresponding to the variable portion of the message pattern in the first log data matches a value corresponding to the variable portion of the message pattern in the second log data, the second case being a case in which the value of the configuration information of the first device does not match the corresponding value of the configuration information of the second device and in which the value corresponding to the variable portion of the message pattern in the first log data does not match the value corresponding to the variable portion of the message pattern in the second log data;

acquiring configuration information with respect to one of the plurality of devices;

storing the configuration information of the one of the plurality of devices in a configuration information storage area in the storage;

acquiring another piece of log data with respect to the one of the plurality of devices;

determining whether the stored message pattern is included in the another piece of log data that has been acquired;

extracting, from the another piece of log data that has been acquired, a value of the variable portion of the stored message pattern when it is determined that the stored message pattern is included in the another piece of log data that has been acquired and when a value of the stored configuration information of the one of the plurality of devices is different from the value of the variable portion of the stored message pattern in the another piece of log data that has been acquired; and outputting the extracted value to the storage to update the value of the stored configuration information of the one of the plurality of devices to the extracted value.

* * * * *